(12) United States Patent
Ogura et al.

(10) Patent No.: US 8,852,065 B2
(45) Date of Patent: Oct. 7, 2014

(54) ROLLING ROLL, ROLLING RING, ROLLING MILL, AND ROLLING ROLL ASSEMBLING METHOD

(75) Inventors: Eiji Ogura, Gifu (JP); Koichi Yuri, Gifu (JP); Tsutomu Fukuda, Gifu (JP); Mitsuhiro Takatsuki, Gifu (JP)

(73) Assignee: Mitsubishi Materials Corporation, Tokyo (JP)

( * ) Notice: Subject to any disclaimer, the term of this patent is extended or adjusted under 35 U.S.C. 154(b) by 1328 days.

(21) Appl. No.: 12/327,085

(22) Filed: Dec. 3, 2008

(65) Prior Publication Data

US 2009/0280972 A1 Nov. 12, 2009

Related U.S. Application Data

(60) Provisional application No. 61/051,049, filed on May 7, 2008.

(51) Int. Cl.
*B25F 5/02* (2006.01)
*F16C 13/00* (2006.01)
*B21B 27/03* (2006.01)

(52) U.S. Cl.
CPC ............. *F16C 13/00* (2013.01); *B21B 27/035* (2013.01)
USPC .............................................. 492/47; 492/42

(58) Field of Classification Search
CPC .... B21B 27/03; B21B 27/032; B21B 27/035; B21B 27/05; B21B 27/055; F16C 13/00; F16D 1/094; F16D 1/096
USPC ...................................................... 492/49, 47
See application file for complete search history.

(56) References Cited

U.S. PATENT DOCUMENTS

| 3,727,957 | A | * | 4/1973 | Brown et al. | 403/355 |
| 3,803,691 | A | * | 4/1974 | Geese et al. | 403/15 |
| 3,866,283 | A | * | 2/1975 | Gould | 492/60 |
| RE31,554 | E | * | 4/1984 | Giege et al. | 492/21 |
| 4,650,364 | A | | 3/1987 | Kark | |

(Continued)

FOREIGN PATENT DOCUMENTS

| EP | 1378298 A2 * | 1/2004 |
| GB | 1499521 A * | 2/1978 |

(Continued)

OTHER PUBLICATIONS

Japanese Office Action mailed Nov. 16, 2010, for the corresponding Japanese patent application No. 2007-082040.

*Primary Examiner* — Jacob Cigna
(74) *Attorney, Agent, or Firm* — Leason Ellis LLP.

(57) ABSTRACT

The present invention provides a rolling roll that has a shaft, which rotates around an axis and has one end that is connected to an output shaft of a rolling mill, and is configured such that a tubular sleeve member is mounted to a portion of the shaft on the side of another end, and a rolling ring, which is formed from a hard material, is fixed to an outer circumference of the sleeve member, wherein an inner circumferential support part is disposed on an outer circumferential side of the sleeve member; the rolling ring is supported by the sleeve member via the inner circumferential support part; a pressing member and a pressing mechanism are disposed on the other end side of the rolling ring; and the pressing member and the pressing mechanism press the rolling ring toward the one end side, thereby fixing it.

14 Claims, 14 Drawing Sheets

(56) References Cited

U.S. PATENT DOCUMENTS

| | | | |
|---|---|---|---|
| 4,827,584 A * | 5/1989 | Pav et al. | 492/7 |
| 5,665,044 A * | 9/1997 | Tomat et al. | 492/47 |
| 5,782,125 A * | 7/1998 | Faggiani et al. | 72/237 |

FOREIGN PATENT DOCUMENTS

| | | |
|---|---|---|
| GB | 2096507 A | 10/1982 |
| JP | 53-123362 A | 10/1978 |
| JP | 57-177814 A | 11/1982 |
| JP | 03-002321 Y2 | 9/1984 |
| JP | 59-209410 A | 11/1984 |
| JP | 63-062204 U | 4/1988 |
| JP | 06-061302 U | 8/1994 |
| JP | 09-314207 A | 12/1997 |
| JP | 10-024303 A | 1/1998 |
| JP | 2000-210706 A | 8/2000 |

\* cited by examiner

ROLLING ROLL, ROLLING RING, ROLLING MILL, AND ROLLING ROLL ASSEMBLING METHOD

CROSS-REFERENCE TO RELATED APPLICATION

The present application claims priority from U.S. Provisional Application No. 61/051,049, filed May 7, 2008, and is hereby incorporated by reference in its entirety herein.

FIELD OF THE INVENTION

The present invention relates to: a so-called cantilevered rolling roll that is configured by fixing a rolling ring, which is made of a hard material, to an outer circumference of a shaft, one end of which is connected to an output shaft of a rolling mill; the rolling ring that constitutes the rolling roll; the rolling mill, which is provided with the rolling roll; and a method of assembling the rolling roll.

BACKGROUND

Generally, when bars and wires of, for example, metal are produced continuously, a process is widely adopted wherein rolling rolls, the outer circumferential surfaces of which have forming grooves formed therein, are used to continuously roll a metal material. To perform such rolling, so-called cantilevered rolling rolls are used, each of which has a shaft with one end connected to an output shaft of a rolling mill, as disclosed in, for example, Japanese Patent No. 3,116,040. In addition, the rolling rolls, each of which is configured by detachably assembling a rolling ring that is made of a hard material, such as cemented carbide, to the outer circumference of the shaft, are used to finish the surface of the product (e.g., wires or bars) so that it is smooth after the material is rolled downstream of the continuous rolling process.

FIG. 14 shows one example of a conventional rolling roll. A rolling roll 1 is formed from, for example, steel and has a shaft 2 that has a substantially columnar shape that extends along an axis L; furthermore, the rolling roll 1 is cantilevered such that one end side (the left side in FIG. 14) of the shaft 2 is connected to the output shaft of the rolling mill (not shown). A tapered part 3 is formed on another end side (the right side in FIG. 14) of the shaft 2 and has an outer diameter that gradually decreases toward the other end side; in addition, a multistepped, columnar small diameter part 4 is further formed on the other end side of the tapered part 3.

A sleeve member 5, which has a tapered hole 6 that is capable of mating with the tapered part 3, is mounted to the shaft 2 from the other end side thereof. The outer circumferential surface of the sleeve member 5 is a cylindrical surface that is parallel to the axis L and is configured so that the wall thickness of the sleeve member 5 gradually thins toward the one end side. In addition, a through hole 7, which extends so that it is coaxial with the tapered hole 6, is drilled in the other end side of the sleeve member 5, and the small diameter part 4 of the shaft 2 is inserted therein.

A substantially toric rolling ring 8, which is formed from a hard material such as cemented carbide, is disposed on the outer circumferential side of the sleeve member 5. A forming groove 9, which has a semicircular cross section and is recessed radially toward the inner side, is formed in the outer circumferential surface of the rolling ring 8 at its center part in the directions of the axis L, and an inner circumferential surface of the rolling ring 8 is a cylindrical surface that is parallel to the axis L.

Here, by moving the sleeve member 5, which is mounted to the shaft 2, to the one end side, the tapered part 3 deforms the sleeve member 5 such that it widens radially toward the outer side. In so doing, the sleeve member 5 presses the inner circumferential surface of the rolling ring 8 so that it widens radially toward the outer side, thereby fixing the rolling ring 8 to the outer circumferential surface of the sleeve member 5. Here, the shaft 2 and the sleeve member 5 are fixed by taper mating, and therefore the rolling roll 1 is configured such that the shaft 2, the sleeve member 5, and the rolling ring 8 are integral.

SUMMARY OF THE INVENTION

Incidentally, in such a rolling roll 1, the rolling ring 8, which comprises a hard material such as cemented carbide, is fixed by pressing its inner circumferential surface so that it widens; consequently, tensile stress acts on the outer circumferential surface of the rolling ring 8 in the circumferential direction. Here, the hard material, e.g., cemented carbide, is generally brittle and unable to withstand tensile stress; consequently, cracks form in the outer circumferential surface of the rolling ring 8. If a crack forms in the outer circumferential surface of the rolling ring 8, there is a risk that the metal material and the like will get into the crack and make it impossible to perform rolling satisfactorily, and also that the crack will enlarge and cause the rolling ring 8 itself to break. Consequently, if a crack occurs, there is a problem in that the rolling ring 8 must be replaced as soon as possible, which significantly increases the operating cost of the rolling roll 1.

To prevent a crack from occurring, the conventional approach is to ensure the rigidity of the rolling ring 8 by increasing its wall thickness in the radial directions and its length in the directions of the axis L; however, in such a case, the portion of the rolling ring 8 that is used for rolling becomes relatively small compared with the entire rolling ring 8, which increases the amount of the cemented carbide material used beyond what is necessary; thereby, the manufacturing cost of the rolling ring 8 increases substantially.

Furthermore, in order to smoothly finish the surface of the rolled product (e.g., a wire or a bar), it is preferable to form the rolling ring 8 with a material that is as hard as possible; however, high-hardness materials tend to be even more brittle and unable to withstand tensile stress, which tends to produce cracks; consequently, the conventional art is unable to improve the surface state of the product by forming the rolling ring 8 with a material of high hardness.

The present invention considers the circumstances discussed above, and it is an object of the present invention to provide: a rolling roll wherein it is possible to prevent cracks from occurring by preventing tensile stress from acting on the outer circumferential surface of a rolling ring, and to reduce operating costs significantly by reducing the size of the rolling ring, which is made of a hard material such as cemented carbide; a rolling ring that constitutes the rolling roll; a rolling mill that is provided with the rolling roll; and a method of assembling the rolling roll.

To achieve the abovementioned object, a rolling roll of the present invention includes a shaft, which rotates around an axis and has one end that is connected to an output shaft of a rolling mill, and is configured such that a tubular sleeve member is mounted to a portion of the shaft on the side of another end, and a rolling ring, which is formed from a hard material, is fixed to an outer circumference of the sleeve member, wherein an inner circumferential support part is disposed on an outer circumferential side of the sleeve member; the rolling ring is supported by the sleeve member via the inner circumferential support part; a pressing member, which presses the side surface of the rolling ring that faces the other end side, and a pressing mechanism, which urges the pressing member toward the one end side, are disposed on the other end side of the rolling ring; and the pressing member and the pressing mechanism press the rolling ring toward the one end side, thereby fixing it.

In addition, a method of assembling a rolling roll includes a shaft, which rotates around an axis and has one end that is connected to an output shaft of a rolling mill, and is configured such that a tubular sleeve member is mounted to a portion of the shaft on the side of another end, and a rolling ring, which is formed from a hard material, is fixed to an outer circumference of the sleeve member, having the steps of disposing an inner circumferential support part on an outer circumferential side of the sleeve member; supporting the rolling ring with the sleeve member via the inner circumferential support part; and pressing the rolling ring toward the one end side using a pressing member and a pressing mechanism that are provided on the other end side of the rolling ring, thereby fixing the rolling ring.

According to the rolling roll and the rolling roll assembling method of the present invention, the rolling ring, which is made of a hard material such as cemented carbide, urges the pressing member toward the one end side, which presses it to the side and thereby fixes it; therefore, the rolling ring is fixed in the state wherein a compressive stress acts on it in the axial directions, which makes it unnecessary to fix the rolling ring by pressing it from the inner circumferential side when supporting the rolling ring with the inner circumferential support part. Accordingly, a tensile stress in the circumferential directions does not act on the outer circumferential surface of the rolling ring, which makes it possible to prevent cracks from occurring in the outer circumferential surface of the rolling ring. Accordingly, it is possible to extend the life of the rolling ring and to reduce the operating cost of the rolling roll significantly.

In addition, because cracks are prevented from occurring in the outer circumferential surface of the rolling ring as discussed above, it is unnecessary to ensure a rigidity of the rolling ring any more than is necessary; therefore, it is possible to reduce the wall thickness of the rolling ring by disposing the inner circumferential support part on the outer circumferential side of the sleeve member. Accordingly, it is possible to reduce the amount of the hard material, such as cemented carbide, used, and to reduce the manufacturing cost of the rolling ring significantly.

Furthermore, the rolling ring is supported by the sleeve member via the inner circumferential support part, and therefore it is possible to dispose the rolling ring so that its axis coincides with the axes of the sleeve member and the shaft, and thereby to perform rolling satisfactorily.

In addition, fixing the rolling ring by pressing it in the axial directions makes it possible to reduce any gaps in the axial directions between adjacent members, and thereby to improve the sealability of the shaft as well as simplify the seal structure.

Here, disposing a side surface support part, which is contacted by a side surface of the rolling ring, on the outer circumferential side of the sleeve member makes it possible to shorten the rolling ring in the axial directions, and thereby to further reduce the amount of the hard material, such as cemented carbide, used, and much more greatly reduce the manufacturing cost of the rolling ring. Furthermore, the side surface support part is formed integrally with the inner circumferential support part, and the recessed part is formed on the inner circumferential side of the inner circumferential support part; therefore, when the pressing mechanism presses the rolling ring, the provision of the recessed part makes it possible for the inner circumferential support part support in each embodiment to bend the side surface support part support toward the side of the abovementioned side surface of the rolling ring, and therefore even greater compressive stress can be applied in the axial directions.

In addition, disposing the hydraulic nut on the other end side of the pressing member makes it possible to adjust the pressing force of the pressing member in the circumferential directions evenly by controlling the hydraulic pressure, and to attach and detach the rolling ring easily and reliably. Thereby, it is possible to significantly reduce the time and labor needed to perform the rolling roll assembly work. Here, the hydraulic nut may be configured as the pressing mechanism wherein its hydraulic pressure continuously urges the rolling ring via the pressing member; however, if, for example, an elastic member is interposed between the pressing member and the hydraulic nut, then the elastic member functions as the pressing mechanism that presses the rolling ring and thereby fixes such by urging the pressing member toward the one end side, which makes it possible to terminate the pressing force of the hydraulic pressure of the hydraulic nut after the rolling ring is fixed in this manner.

In addition, for example, the hydraulic nut may be screwed to the other end of the shaft and press the rolling ring toward the one end side, and the pressing member may be a pressing nut that is screwed to this shaft; alternatively, a retainer may be interposed between the hydraulic nut and the pressing member, and the pressing member may maintain its position in the axial directions in this pressed state; in this case as well, even if the hydraulic pressure does not continuously act on the hydraulic nut, when the pressing force from the hydraulic nut is terminated, the shaft, which elastically deformed such that it extends because of the tensile stress applied when the hydraulic nut pressed the rolling ring, contracts in the axial directions as a result of its elasticity, and therefore the shaft itself functions as a pressing mechanism that urges the pressing member toward the one end side; therefore, particularly in the case wherein the pressing member is a pressing nut that is screwed to the shaft on the other end side of the rolling ring, the hydraulic nut is detachably disposed, and therefore the rolling roll can be used even if the hydraulic nut is removed during rolling.

Furthermore, forming the inner circumferential support part integrally with the sleeve member makes it possible to reduce the number of parts that constitute the rolling roll, and therefore to simplify the rolling roll assembly work. Particularly in this case, making the inner circumferential support part a projecting part that projects from the outer circumference of the sleeve member radially toward the outer side makes it possible to reduce the wall thickness of the rolling ring commensurate with the size of the formed projecting part, and therefore to reliably reduce the amount of the hard material, such as cemented carbide, used.

However, making the inner circumferential support part a spacer that is interposed between the sleeve member and the rolling ring that is separate therefrom makes it possible to configure the rolling roll of the present invention using a conventional sleeve member, the outer diameter of which is constant. Accordingly, it is possible to configure the rolling roll of the present invention without, for example, specially modifying the conventional rolling mill and the like, and therefore to reduce the operating cost of the rolling roll.

Furthermore, even if the size of the rolling ring itself, which is formed from a hard material such as cemented carbide, is reduced by fixing the inner circumferential support part to the rolling ring by, for example, press-fitting or bonding it to the inner circumferential surface of the rolling ring, the rolling ring can be handled the same as a conventional rolling ring. In addition, because the rolling ring and the inner circumferential support part are formed integrally, it is possible to reduce the number of parts that constitute the rolling roll and to simplify the rolling roll assembly work.

A rolling ring according to the present invention is a rolling ring that is used by a rolling roll as described above, wherein a pressed surface, which is pressed by the pressing member, is formed in a side surface; and an inner diameter is larger than an outer diameter of a portion of the sleeve member at which the inner circumferential support part is not disposed.

The wall thickness of this rolling ring is less than that of a conventional rolling ring, and therefore it is possible to reduce the amount of the hard material, such as cemented carbide, used, and to manufacture the rolling ring at a lower cost.

A rolling mill according to the present invention includes a rolling roll as described above; and a receiving surface that receives a pressing force from the pressing member. According to this rolling mill, because the rolling ring can be fixed by the pinching of the pressing member and the receiving surface, it is unnecessary to fix the rolling ring by pressing it so that its inner circumferential surface widens, and it is possible to reliably prevent the tensile stress from acting on the outer circumferential surface of the rolling ring, and thereby to prevent cracks from occurring. Furthermore, with this rolling mill, if the shaft has a step part, the diameter of which expands toward the one end side, then forming the receiving surface in this step part makes it possible to fix the rolling ring by pinching it more firmly.

The present invention can provide: a rolling roll wherein it is possible to prevent cracks from occurring by preventing tensile stress from acting on the outer circumferential surface of a rolling ring, and to reduce operating costs significantly by reducing the size of the rolling ring, which is made of a hard material such as cemented carbide; a rolling ring that constitutes the rolling roll; a rolling mill that is provided with the rolling roll; and a method of assembling the rolling roll.

DETAILED DESCRIPTION OF THE INVENTION

Figure 1:
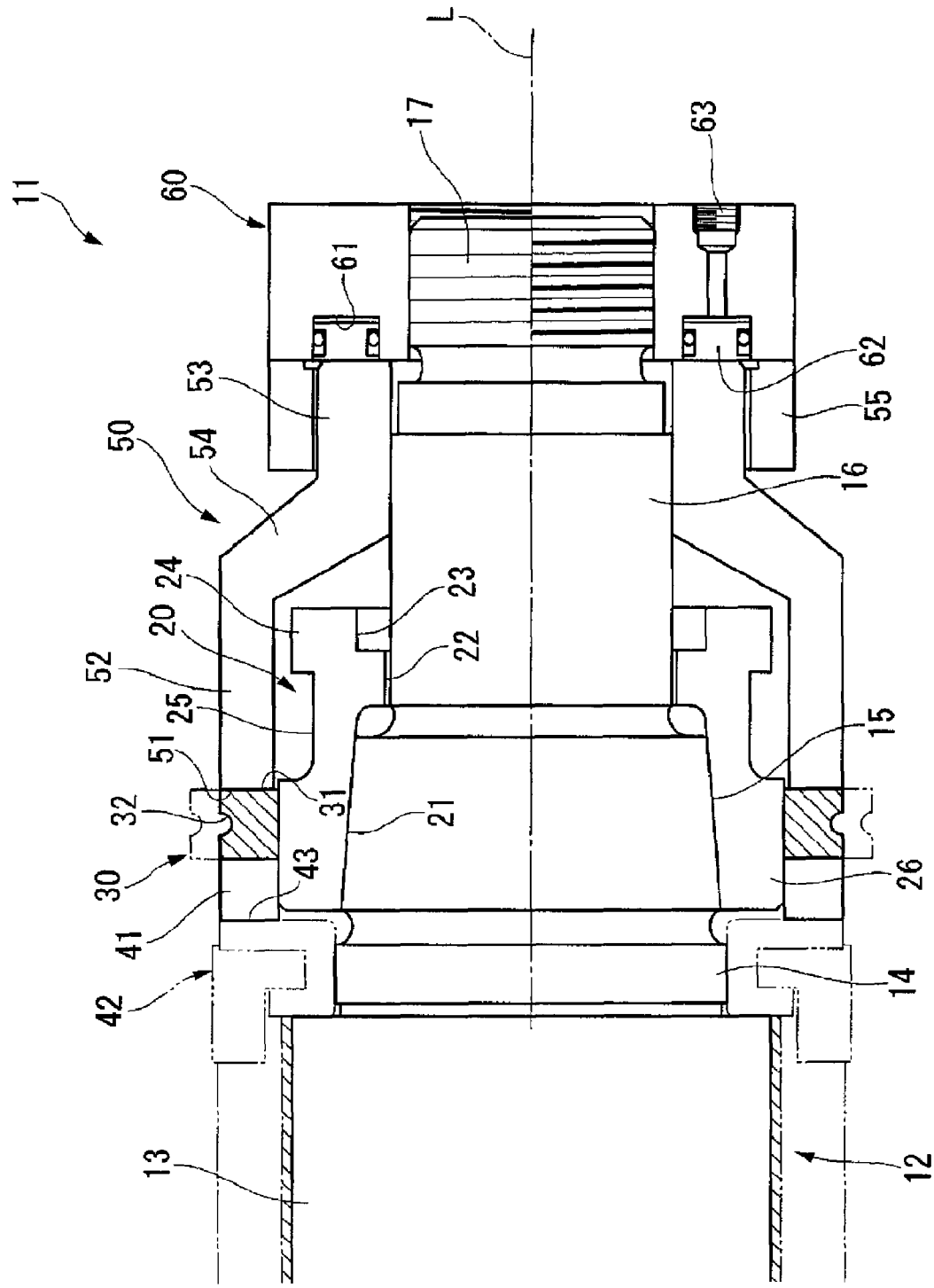
FIG. 1 is a side cross sectional view of a rolling roll according to an embodiment of the present invention.

The following explains a rolling roll according to the embodiments of the present invention, referencing the attached drawings. FIG. 1 shows a rolling roll 11 according to an embodiment of the present invention.

The rolling roll 11 has a substantially columnar shaft 12 that extends along an axis L and is formed from, for example, steel, and is a so-called cantilevered rolling roll that is configured so that a large diameter part 13, one end of which is connected to an output shaft of a rolling mill (not shown) so that it rotates around the axis L, is formed at a portion of the shaft 12 on one end side (the left side in FIG. 1).

A medium diameter part 14, the diameter of which is one step smaller than that of the large diameter part 13, is formed on another end side (the right side in FIG. 1) of the large diameter part 13, and a tapered part 15, the outer diameter of which gradually decreases toward the other end side, is further formed on the other end side of the medium diameter part 14. In addition, a small diameter part 16, the diameter of which is one step smaller than the portion of the tapered part 15 on the other end side, is further formed on the other end side of the tapered part 15, and a male thread part 17, wherein a male thread is formed on an outer circumferential surface thereof, is further formed on the other end side of the small diameter part 16 (the other end of the shaft 12). Namely, the shaft 12 has a multistepped, columnar shape that is disposed so that it extends coaxially with the large diameter part 13, the medium diameter part 14, the tapered part 15, the small diameter part 16, and the male thread part 17.

A substantially cylindrical sleeve member 20 is mounted to the shaft 12 from the other end side. A tapered hole 21 is formed in the sleeve member 20 so that it is open toward the one end side of the sleeve member 20 and so that its inner diameter gradually decreases toward the other end side, and a configuration is adopted wherein the taper angle of the tapered hole 21 and the taper angle of the tapered part 15 of the shaft 12 are set so that they are substantially identical and so that the tapered part 15 and the tapered hole 21 are capable of mating. A through hole 22, the diameter of which is one step smaller than that of the portion of the tapered hole 21 on the other end side, is formed to the other end side of the tapered hole 21, and a countersink hole 23, the diameter of which is larger than that of the through hole 22, is further formed to the other end side of the through hole 22 and is open at the other end surface of the sleeve member 20. The small diameter part 16 of the shaft 12 is inserted through the through hole 22 and the countersink hole 23.

Moreover, a flange part 24, the diameter of which is one step larger than that of the other end portion of the sleeve member 20, is formed on the outer circumferential surface of the sleeve member 20, and a constant diameter part 25, the outer diameter of which is constant and the outer circumferential surface of which is a cylindrical surface that is parallel to the axis L, is formed on the one end side of the flange part 24. Furthermore, a projecting part 26, which projects from the outer circumferential surface of the constant diameter part 25 radially toward the outer side, is formed on the one end side of the constant diameter part 25. The projecting part 26 serves as an inner circumferential support part that supports an inner circumferential surface of a rolling ring 30, which is discussed below, and its outer circumferential surface is a cylindrical surface, the axial center of which is the axis L. In other words, in the present embodiment, the inner circumferential support part is formed integrally with the sleeve member 20.

A rolling ring 30, which is formed from cemented carbide and is substantially toric, is disposed on the outer circumferential side of the projecting part 26, and the side surface thereof that faces the other end side serves as a pressed surface 31, which is pressed by a pressing member 50 (discussed below).

A forming groove 32, which has a semicircular cross section that is recessed radially toward the inner side, is formed in the outer circumferential surface of the rolling ring 30 at its center part in the directions of the axis L. In addition, the inner circumferential surface of the rolling ring 30 is a cylindrical surface, the axial center of which is the axis L, and its inner diameter thereof larger than the outer diameter of the constant diameter part 25, wherein the inner circumferential support part (the projecting part 26) of the sleeve member 20 is not formed, and is substantially identical to the outer diameter of the projecting part 26 portion.

In detail, the inner diameter of the rolling ring 30 is just slightly larger than the outer diameter of the portion at which the inner circumferential support part (the projecting part 26) of the sleeve member 20 is formed, the inner circumferential surface of the rolling ring 30 is supported by the projecting part 26 in the state wherein the sleeve member 20 is mated to the tapered part 15, the axial center of the rolling ring 30 is made to coincide with the axis L of the shaft 12, and, in this state, a small clearance is formed between the rolling ring 30 and the projecting part 26 so that the rolling ring 30 can slide in the directions of the axis L.

Furthermore, the outer circumferential surface of the rolling ring 30, which wears due to rolling, is repolished, and consequently the outer diameter of the rolling ring 30 gradually decreases as it is used. Consequently, a discard outer diameter is set in the rolling ring 30, and the life of the rolling ring 30 is finished when its outer circumference falls below the discard outer diameter. Furthermore, in FIG. 1, the initial state of the rolling ring 30 is indicated by a broken line, and the state wherein the outer diameter has reached the discard outer diameter is indicated by the solid line.

In addition, a ring shaped spacer 41, which is formed from, for example, steel, is disposed on an outer circumference of the projecting part 26 and functions as a side surface support part, which is contacted by the side surface of the rolling ring 30 that faces the one end side. The spacer 41 has an inner diameter that is substantially identical to the inner diameter of the rolling ring 30 and is capable of sliding in the directions of the axis L, the same as the rolling ring 30; furthermore, the spacer 41 has an outer diameter that is substantially identical to the discard outer diameter of the rolling ring 30.

In addition, a receiving part 42, which is provided with a receiving surface 43 that receives a pressing force produced by the pressing member 50 (discussed below), is disposed on the one end side of the side surface support part; in the present embodiment, the receiving part 42 is disposed so that it mates with an outer circumferential portion of the medium diameter part 14 of the shaft 12.

The pressing member 50, which presses the rolling ring 30 toward the one end side, is disposed on the other end side of the rolling ring 30. The pressing member 50 is formed from, for example, steel, and has a multistepped, cylindrical shape, the axial center of which is the axis L, and has a portion on the one end side that is a pressing part 52 that is provided with a pressing surface 51, which is contacted by the pressed surface 31 of the rolling ring 30, and a portion on the other end side that is a retainer mounting part 53, the outer circumference of which is screwed to a ring shaped retainer 55.

The pressing part 52 has an outer diameter that is substantially identical to the discard outer diameter of the rolling ring 30 and an inner diameter that is slightly larger than the outer diameter of the projecting part 26 portion of the sleeve member 20. In addition, the retainer mounting part 53 has an outer diameter that is substantially identical to the constant diameter part 25 of the sleeve member 20, and an inner diameter that is substantially identical to the outer diameter of the small diameter part 16 of the shaft 12, and a male thread is formed on its outer circumferential surface. A coupling part 54, which is inclined so that its outer diameter and its inner diameter become gradually smaller toward the other end side, is formed between the pressing part 52 and the retainer mounting part 53.

In addition, a substantially toric hydraulic nut 60, wherein a female thread is formed on the inner circumference thereof, is disposed on the other end side of the pressing member 50 and functions as a pressing mechanism that urges the pressing member 50 toward the one end side. An annular groove 61, which has a U shaped cross section and is open on the one end side, is formed in the surface of the hydraulic nut 60 that faces the one end side; furthermore, a pressing ring 62 is housed in the annular groove 61 so that it is capable of advancing and retracting in the directions of the axis L and so that it is hermetically sealed via an oil seal, and the annular groove 61, which is on the other end side of the pressing ring 62, is filled with a hydraulic oil.

In addition, the hydraulic nut 60 comprises a hydraulic adjusting part 63, which is in communication with a bottom surface on the other end side of the annular groove 61 and adjusts the hydraulic pressure inside the annular groove 61.

The hydraulic nut 60 is screwed to the male thread part 17 of the shaft 12, and the pressing ring 62 is disposed so that it is contacted by the surface of the pressing member 50 on the other end side and is not contacted by the retainer 55.

The following explains a method of assembling the rolling roll 11. The hydraulic pressure inside the annular groove 61 is raised by the hydraulic adjusting part 63, which is provided to the hydraulic nut 60, in the state wherein the sleeve member 20, the rolling ring 30, the pressing member 50, the hydraulic nut 60, and the like are disposed with respect to the shaft 12 as discussed above. In so doing, the pressing ring 62 moves toward the one end side, which urges the pressing member 50 toward the one end side, and the pressing surface 51 of the pressing member 50 presses the pressed surface 31 of the rolling ring 30 toward the one end side. Thereby, the rolling ring 30 and the spacer 41 slide in the direction of the axis L that is toward the one end side and are fixed by the pinching of the pressing surface 51 and the receiving surface 43 of the receiving part 42. At this time, the sleeve member 20 does not move in the directions of the axis L, and consequently the rolling ring 30 does not bear the pressing force that would press its inner circumferential surface and make it wider.

In the state wherein the hydraulic pressure is raised, the pressing member 50 moves toward the one end side, the retainer 55, which is screwed to the outer circumference of the pressing member 50, also moves toward the one end side, and thereby an air gap is created between the retainer 55 and the hydraulic nut 60. Here, if the hydraulic adjusting part 63 terminates the raising of the hydraulic pressure after the retainer 55 is rotated and brought into close contact with the hydraulic nut 60, then the pressing member 50 cannot return to the other end side because it is engaged with the retainer 55 and therefore continues to press the rolling ring 30. In so doing, the rolling ring 30 is fixed, and the rolling roll 11 is thus configured.

Furthermore, if the hydraulic nut 60 presses the rolling ring 30 and the spacer 41 in the direction of the axis L that is toward the one end side via the pressing member 50 as discussed above, then the shaft 12, particularly the tapered part 15 and the small diameter part 16, is pulled in the direction of the axis L that is toward the other end side and thereby elastically deforms just slightly such that it extends. Furthermore, if the hydraulic adjusting part 63 of the hydraulic nut 60 terminates the raising of the hydraulic pressure with the retainer 55 in close contact with the hydraulic nut 60 as discussed above and the position of the pressing member 50 maintained as is in the state wherein the rolling ring 30 is pressed, then the shaft 12 attempts to return to its original state as a result of elasticity and deforms such that it contracts in the direction of the axis L that is the reverse of that described above; accordingly, the pressing member 50 transitions to the state wherein, even though the hydraulic pressure does not act upon it, it is urged in the direction of the axis L that is toward the one end side via the hydraulic nut 60 and the retainer 55. Namely, in the state wherein the hydraulic pressure of the hydraulic nut 60 is thus terminated, the shaft 12 itself becomes a pressing mechanism that urges the pressing member 50 toward the one end side; accordingly, even if the hydraulic pressure is not always brought into action, it is possible to fix the rolling ring 30 during rolling by pressing it toward the one end side.

With the rolling roll 11 of this configuration, the pressing member 50 presses the rolling ring 30, which is made of cemented carbide, toward the one end side and thereby the receiving surface 43 and the pressing surface 51 pinch the rolling ring 30, which is thereby fixed; thereby, a compressive stress acts on the rolling ring 30 in the directions of the axis L. In addition, the pressing force that presses the inner circumference of the rolling ring 30 so that it widens is not applied, and therefore a tensile stress does not act on the outer circumferential surface of the rolling ring 30. Accordingly, it is possible to prevent cracks from occurring in the outer circumferential surface of the rolling ring 30; thereby, the life of the rolling ring 30 can be extended, which significantly reduces the operating cost of the rolling roll 11 and makes it possible to use the rolling roll 11 for satisfactory rolling over a long time period.

In addition, it is possible to increase the inner diameter and decrease the wall thickness of the rolling ring 30 because the projecting part 26 is formed in the sleeve member 20 as an inner circumferential support part that supports the inner circumferential side of the rolling ring 30. In addition, it is possible to shorten the length of the rolling ring 30 in the directions of the axis L because the spacer 41, which serves as a side surface support part that supports the side surface of the rolling ring 30 that faces the one end side, is disposed. Therefore, reducing the size of the rolling ring 30 and the amount of the cemented carbide material used makes it possible to lower the manufacturing cost of the rolling ring 30 significantly.

Furthermore, preventing cracks from forming makes it possible to use materials that are even harder than cemented carbide, which can improve the abrasion resistance and extend the life of the rolling ring 30 and make it possible to finish the surface of the rolled product (e.g., a wire or a bar) so that it is smooth.

In addition, the provision of the hydraulic nut 60 as a pressing mechanism that urges the pressing member 50 toward the one end side makes it possible to adjust the pressing force of the pressing member 50 by controlling the hydraulic pressure inside the annular groove 61 of the hydraulic nut 60 from one location, i.e., the hydraulic adjusting part 63, thereby fixing the rolling ring 30. Accordingly, it is possible to easily and reliably attach and detach the rolling ring 30, and to significantly reduce the time and labor needed to assemble the rolling roll 11. In addition, the retainer 55 is interposed between the pressing member 50 and the hydraulic nut 60; therefore, even if the hydraulic adjusting part 63 terminates the pressing force, the pressing member 50 maintains the position at which it presses the rolling ring 30, and the shaft 12 functions as a pressing mechanism that urges the pressing member 50, and thus it is possible to prevent a pressing force that is larger than necessary from acting on the rolling ring 30 because of, for example, fluctuations in the external air temperature caused by, for example, the hydraulic adjusting part 63 reducing the hydraulic pressure during rolling or the like.

Furthermore, the projecting part 26, which serves as an inner circumferential support part that supports the inner circumferential surface of the rolling ring 30, is formed in the sleeve member 20; therefore, it is possible to dispose the rolling ring 30 so that its axial center coincides with the axis L of the shaft 12, and to satisfactorily roll a product (e.g., a wire or a bar) that conforms to the forming groove 32.

In addition, the rolling ring 30 is fixed by pressing it in the direction of the axis L that is toward the one end side, and therefore it is possible to, for example, reduce any gap between contacting members by bringing those members into close proximity and tight contact in the directions of the axis L, thereby improving the sealability of the shaft 12 and ensuring sufficient sealability even if the seal structure is simplified.

In addition, in the present embodiment, the projecting part 26, which is formed integrally with the sleeve member 20, serves as the inner circumferential support part, and therefore it is possible to reduce the number of parts that constitute the rolling roll 11 and to simplify the rolling roll 11 assembly work further.

Figure 2:
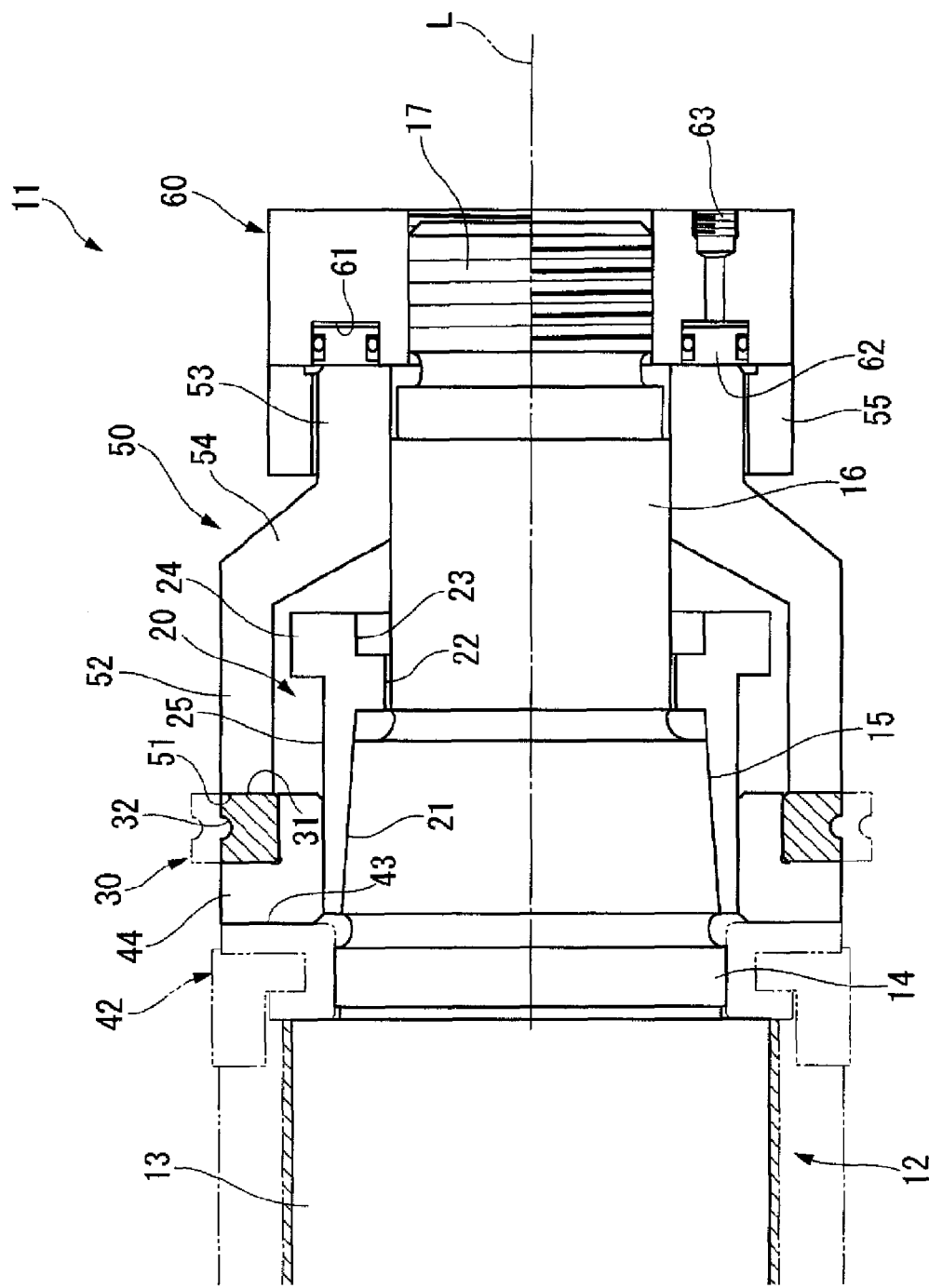
FIG. 2 is a side cross sectional view of a rolling roll according to another embodiment of the present invention.

The following explains the rolling roll 11 according to another embodiment of the present invention. FIG. 2 shows the rolling roll 11 according to the other embodiment of the present invention. Furthermore, members in the present embodiment that are identical to those in the previous embodiment are assigned the same symbols, and detailed explanations thereof is omitted. With the rolling roll 11, the projecting part 26 is not formed in the sleeve member 20, and the outer circumferential surface of the sleeve member 20 comprises the constant diameter part 25, the outer diameter of which is constant, and the flange part 24, the diameter of which is larger than that of the constant diameter part 25. As shown in FIG. 2, an L-shaped spacer 44, the cross section of which is L shaped, is disposed at the outer circumference of the sleeve member 20 (the constant diameter part 25) so that it is detachable from the sleeve member 20 and serves as an inner circumferential support part that supports the inner circumferential surface of the rolling ring 30 and a side surface support part, which is contacted by the side surface of the rolling ring 30 that faces the one end side.

The inner diameter of the L-shaped spacer 44 and the outer diameter of the constant diameter part 25 of the sleeve member 20 are substantially the same, the outer diameter of the portion of the L-shaped spacer 44 that is contacted by the side surface of the rolling ring 30 is the same as the discard outer diameter of the rolling ring 30, and the outer diameter of the portion of the L-shaped spacer 44 that is contacted by the inner circumferential surface of the rolling ring 30 is substantially the same as the inner diameter of the rolling ring 30. In detail, the outer diameter of the portion of the L-shaped spacer 44 that supports the inner circumferential surface of the rolling ring 30 is just slightly smaller than the inner diameter of the rolling ring 30, which forms a clearance, the axial center of the rolling ring 30 is made to coincide with the axis L of the shaft 12 and the sleeve member 20, and the rolling ring 30 is configured so that it is capable of sliding in the directions of the axis L and is supported by the L-shaped spacer 44 without bearing the pressing force that would push its inner circumferential surface and make it wider.

Furthermore, the inner diameter of the L-shaped spacer 44 is also substantially the same as the outer diameter of the constant diameter part 25 of the sleeve member 20; however, a small clearance is formed therebetween, and therefore the L-shaped spacer 44 is capable of sliding in the directions of the axis L; furthermore, the rolling ring 30 does not bear the pressing force from the L-shaped spacer 44 that pushes its inner circumferential surface and makes it widen.

In addition, the surface of the L-shaped spacer 44 that faces the one end side contacts the receiving surface 43, and the receiving surface 43 and the pressing surface 51 of the pressing member 50 pinch the L-shaped spacer 44 and the rolling ring 30, which are fixed thereby.

The rolling roll 11 according to the present embodiment can be configured so that the rolling ring 30, the wall thickness and the length in the directions of the axis L of which are reduced, is fixed by the L-shaped spacer 44 using the conventional sleeve member 20 that, with the exception of the flange part 24, has a constant outer diameter, therefore making it unnecessary to newly manufacture the sleeve member 20. In addition, because the rolling ring 30 is fitted onto the L-shaped spacer 44, it is possible to improve the seatability of the rolling ring 30 and to fix the rolling ring 30 more reliably.

Figure 3:
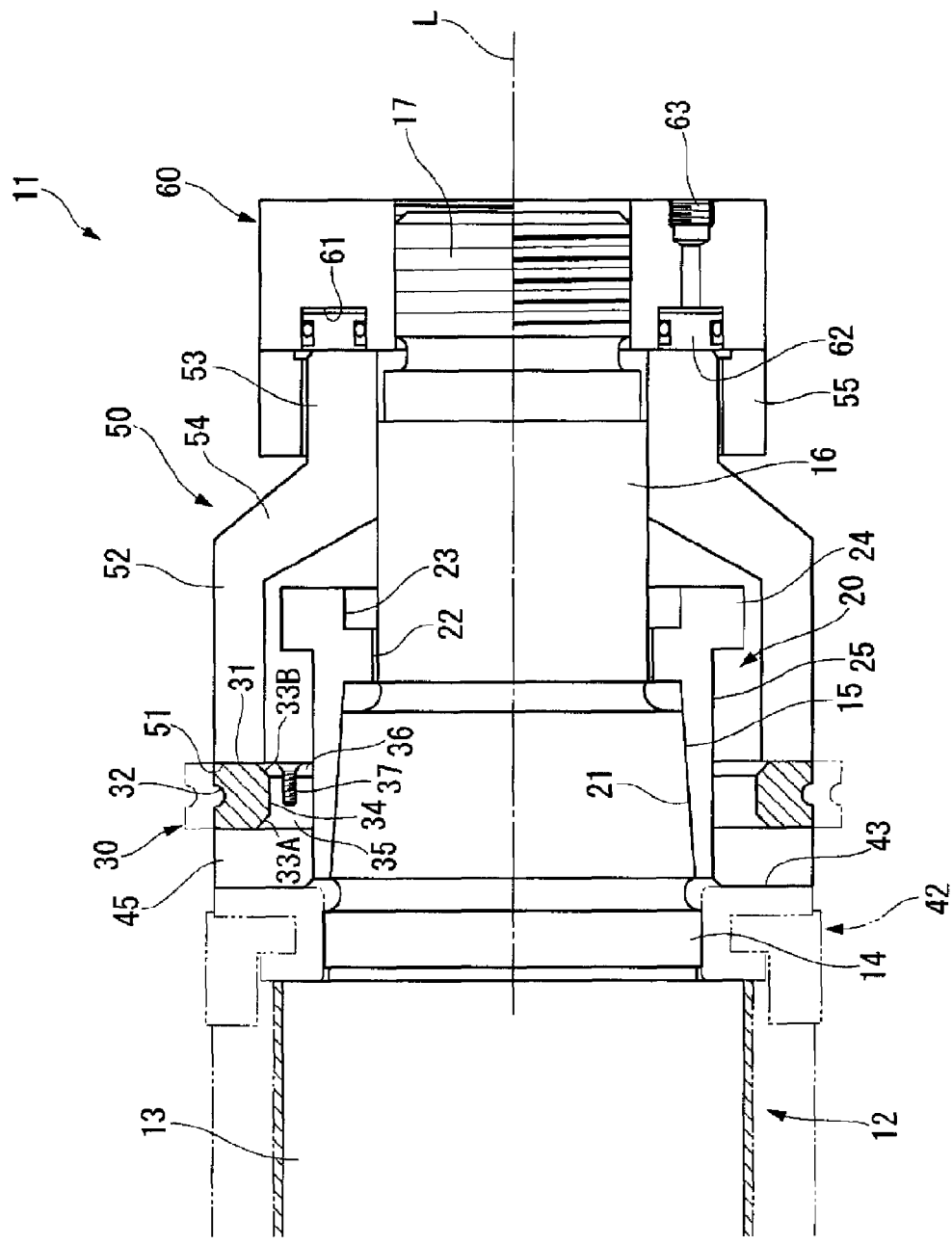
FIG. 3 is a side cross sectional view of a rolling roll according to a further embodiment of the present invention.

The following explains the rolling roll 11 according to a further embodiment of the present invention. FIG. 3 shows the rolling roll 11 according to this embodiment of the present invention. Furthermore, members that are identical to those in the above embodiments are assigned the same symbols, and detailed explanations thereof are omitted.

With this rolling roll 11 as well, the projecting part 26 is not formed in the sleeve member 20, the same as in the above embodiment, and the outer circumferential surface of the sleeve member 20 comprises the constant diameter part 25, the outer diameter of which is constant, and the flange part 24, the diameter of which is larger than that of the constant diameter part 25.

The inner circumferential surface of the rolling ring 30 is beveled on the portions on the one end side and the other end side, and comprises two tapered surface parts 33A, 33B, each of which is inclined so that the distance to the center of the rolling ring 30 in the width directions gradually decreases as it approaches the inner circumferential side, and a cylindrical surface part 34, which is positioned between the pair of tapered surface parts 33A, 33B and is disposed so that it is parallel to the axis L. A ring shaped base metal 35, which contacts the cylindrical surface part 34 and the tapered surface part 33A on the one end side, is press-fitted, e.g., expansion fitted, to the rolling ring 30 and is thereby fixed to the inner circumferential side thereof, and a presser member 36, which is contacted by the tapered surface part 33B on the other end side and the surface of the base metal 35 that faces the other end side, is mounted by a clamping screw 37.

In the present embodiment, the base metal 35 serves as the inner circumferential support part, and the inner diameter of the base metal 35 is slightly larger than the outer diameter of the constant diameter part 25 of the sleeve member 20, which forms a clearance; furthermore, the rolling ring 30 is supported by the sleeve member 20 via the base metal 35, and its axial center is made to coincide with the axis L of the shaft 12 and the sleeve member 20, and therefore the base metal 35 and the rolling ring 30 are capable of sliding in the directions of the axis L.

In addition, a ring shaped spacer 45, which serves as a side surface support part that is contacted by the side surfaces of the base metal 35 and the rolling ring 30 that face the one end side, is disposed on the one end side of the rolling ring 30, and the surface of the spacer 45 that faces the one end side contacts the receiving surface 43 of the receiving part 42. The receiving surface 43 and the pressing surface 51 of the pressing member 50 pinch the spacer 45 and the rolling ring 30, which are fixed thereby, and the rolling roll 11 is thus configured.

According to the rolling roll 11 of the present embodiment, the base metal 35, which serves as an inner circumferential support part, is press-fitted, e.g., expansion fitted, to the inner circumferential surface of the rolling ring 30 and is fixed thereby; thus, the base metal 35 is integral with the rolling ring 30, which makes the rolling roll 11 assembly work easier to perform. In addition, with the present embodiment, the base metal 35 and the presser member 36 contact the pair of tapered surface parts 33A, 33B, which prevents the base metal 35 from separating from the inner circumferential surface of the rolling ring 30. Furthermore, when the inner circumferential support part (the base metal 35) is press-fitted, e.g., expansion fitted, to the inner circumferential surface of the rolling ring 30 and fixed thereby, an adhesive may be used in parallel.

Figure 4:
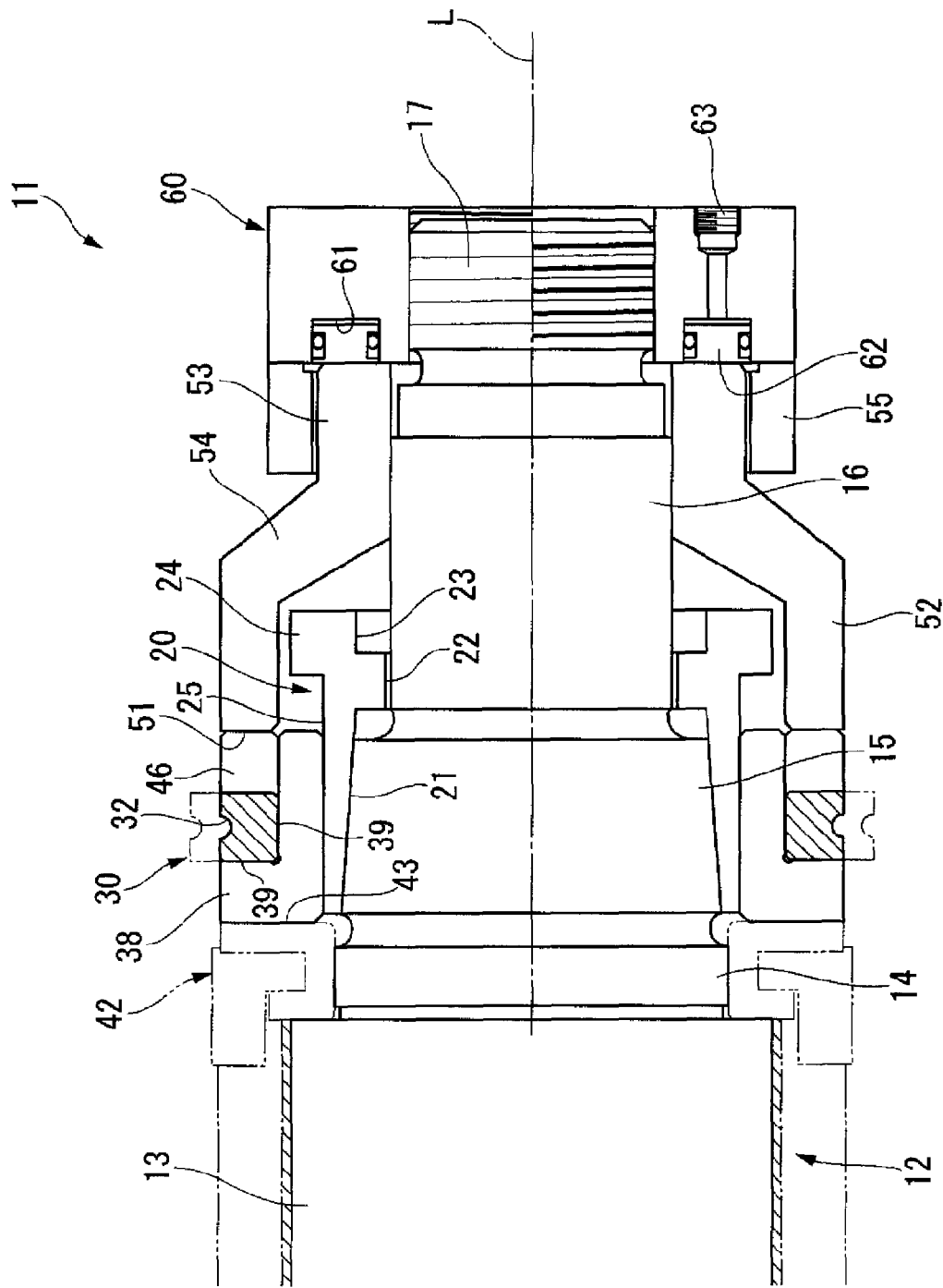
FIG. 4 is a side cross sectional view of a rolling roll according to an embodiment of the present invention.

The following explains the rolling roll 11 according to another embodiment of the present invention. FIG. 4 shows the rolling roll 11 according to this embodiment of the present invention. Furthermore, members that are identical to those in the previous embodiments are assigned the same symbols, and detailed explanations thereof are omitted.

In this rolling roll 11 as well, the projecting part 26 is not formed in the sleeve member 20, the same as in the above two embodiments, and the outer circumferential surface of the sleeve member 20 comprises the constant diameter part 25, the outer diameter of which is constant, and the flange part 24, the diameter of which is larger than that of the constant diameter part 25.

A steel holder 38, the cross section of which is L shaped as shown in FIG. 4, is disposed in the outer circumference of the sleeve member 20 (the constant diameter part 25) and serves as the side surface support part that is contacted by the side surfaces of the inner circumferential support part and the rolling ring 30 that face the one end side. The steel holder 38 is mated to the rolling ring 30 and is fixed to the inner circumferential surface of the rolling ring 30 and the side surface of the rolling ring 30 that faces the one end side by bonding it with an adhesive 39, and the steel holder 38 and the rolling ring 30 are thereby configured integrally.

Here, in the present embodiment, the inner diameter of the steel holder 38 is slightly larger than the outer diameter of the constant diameter part 25 of the sleeve member 20, which forms a clearance, the rolling ring 30 is supported by the sleeve member 20 via the steel holder 38, the axial center of the rolling ring 30 is made to coincide with the axis L of the shaft 12 and the sleeve member 20, and thereby the steel holder 38 and the rolling ring 30 are capable of sliding in the directions of the axis L.

The length of the steel holder 38 in the directions of the axis L is greater than that of the rolling ring 30, a ring spacer 46 is disposed on the outer circumferential side of the steel holder 38 so that it is proximate to the other end side of the rolling ring 30, and the surface of the ring spacer 46 on the other end side contacts the pressing surface 51 of the pressing member 50. In other words, in the present embodiment, the pressing member 50 presses the pressed surface 31 of the rolling ring 30 via the ring spacer 46.

In addition, the surface of the steel holder 38 that faces the one end side contacts the receiving surface 43 of the receiving part 42, the receiving surface 43 of the receiving part 42 and the pressing surface 51 of the pressing member 50 pinch the steel holder 38, the rolling ring 30, and the ring spacer 46, which are fixed thereby, and the rolling roll 11 is thus configured.

According to the rolling roll 11 of the present embodiment, the steel holder 38 and the rolling ring 30 are integrally fixed by bonding them with the adhesive 39, which makes it possible to perform the rolling roll 11 assembly work more easily. In addition, the ring spacer 46 is disposed not only in the side surface of the rolling ring 30 that faces the one end side, but also in the side surface that faces the other end side, and it is therefore possible to reduce the length of the pressing part 52 of the pressing member 50 in the directions of the axis L, and to reliably press the rolling ring 30 in a direction that is parallel to the axis L by reducing the elastic deformation of the pressing part 52.

Furthermore, the rolling ring 30 is fixed by bonding it using the adhesive 39; therefore, the rolling ring 30 does not bear the pressing force that would widen its inner circumference, which makes it possible to reliably prevent cracks from occurring in the outer circumferential surface of the rolling ring 30.

In addition, the steel holder 38, which serves as a inner circumferential support part and a side surface support part, is configured by integrally fixing it to the rolling ring 30 by bonding, which makes it possible to simplify the rolling roll 11 assembly work further.

Next, FIG. 5 through FIG. 12 show the additional embodiments of the present invention, wherein portions that are in common with the previous embodiments shown in FIG. 1 through FIG. 4 are assigned the same symbols, and the explanations thereof are simplified. Aspects that are common to these embodiments include, first, that the inner circumferential support part is formed integrally with the sleeve member 20, the same as in the previous embodiment; namely, the tapered hole 21, which is capable of mating with the tapered part 15 of the shaft 12, and an inner circumferential support part 27, which is a constant diameter part and has an outer diameter that is constant and just slightly smaller than the inner diameter of the rolling ring 30, are formed coaxially in the sleeve member 20, the inner circumferential support part 27 is used to support the inner circumferential surface of the rolling ring 30 in the state wherein the sleeve member 20 is mated to the tapered part 15 so as to make the axial center of the rolling ring 30 coincide with the axis L of the shaft 12, and a small clearance is formed between the rolling ring 30 and the inner circumferential support part 27 so that the rolling ring 30 can slide in the directions of the axis L in this state. Furthermore, in the eighth embodiment shown in FIG. 10, a recessed part 21A, which is open at its inner circumferential surface and has a U shaped cross section, is formed in the tapered hole 21 portion of the inner circumferential side of the sleeve member 20 so that it is shaped annularly around the axis L.

Figure 5:
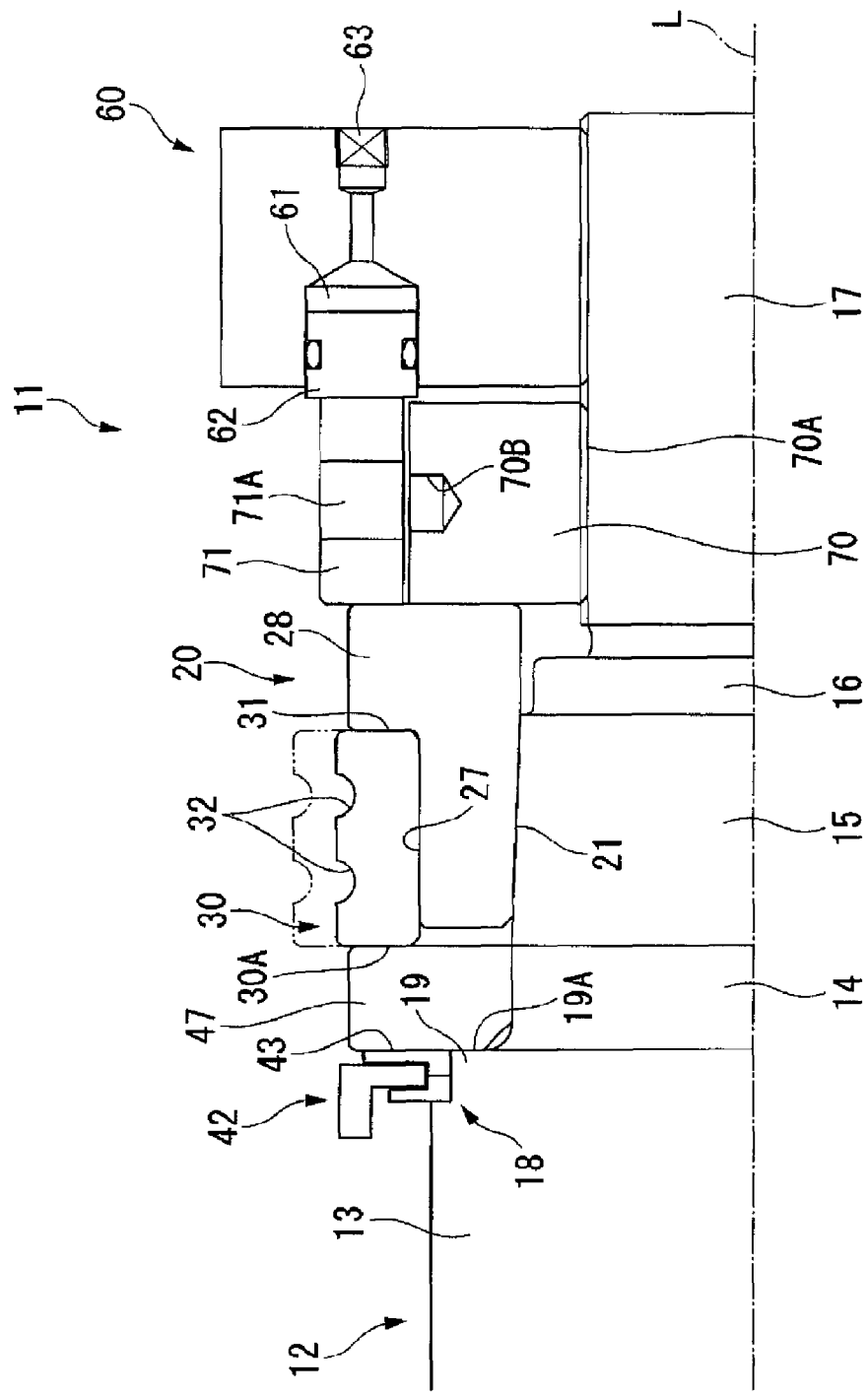
FIG. 5 is a side cross sectional view that shows a rolling roll according to another embodiment of the present invention in a state wherein a hydraulic nut 60 and a pressing ring 71 are attached.
Figure 6:
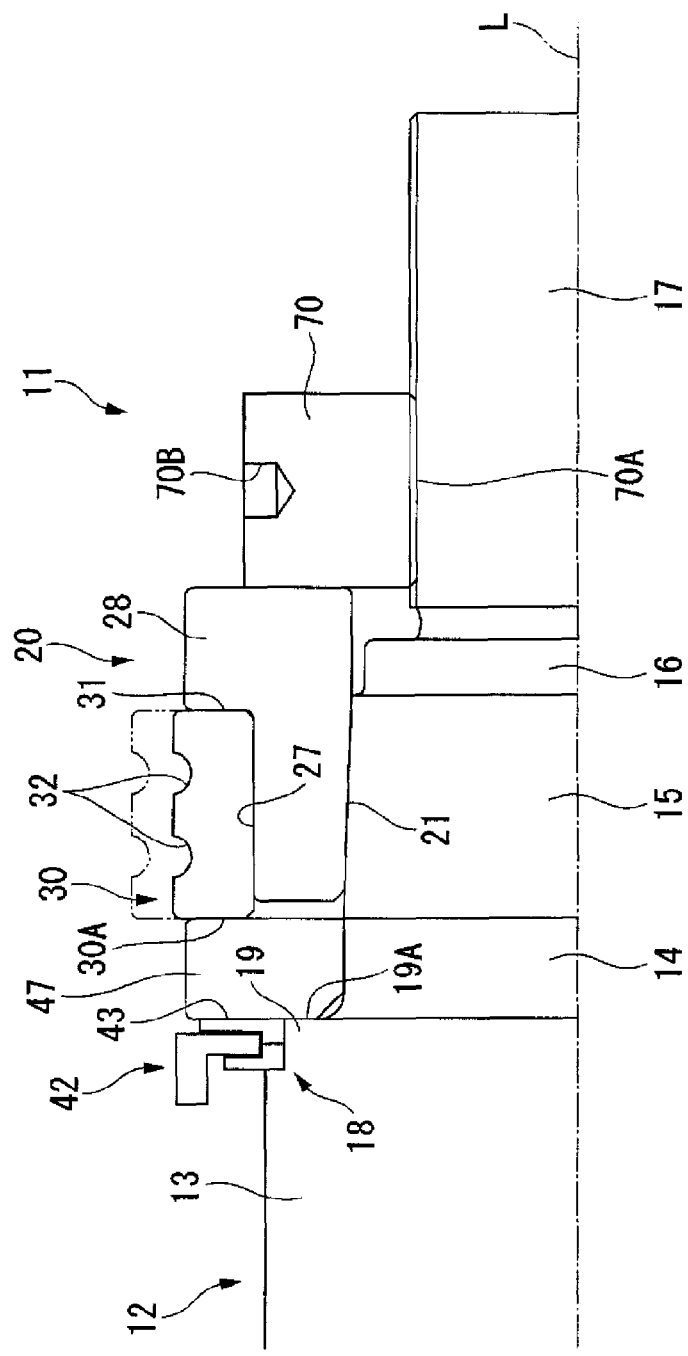
FIG. 6 is a side cross sectional view that shows the rolling roll according to the embodiment of FIG. 5 of the present invention in a state wherein the hydraulic nut 60 and the pressing ring 71 are removed.
Figure 7:
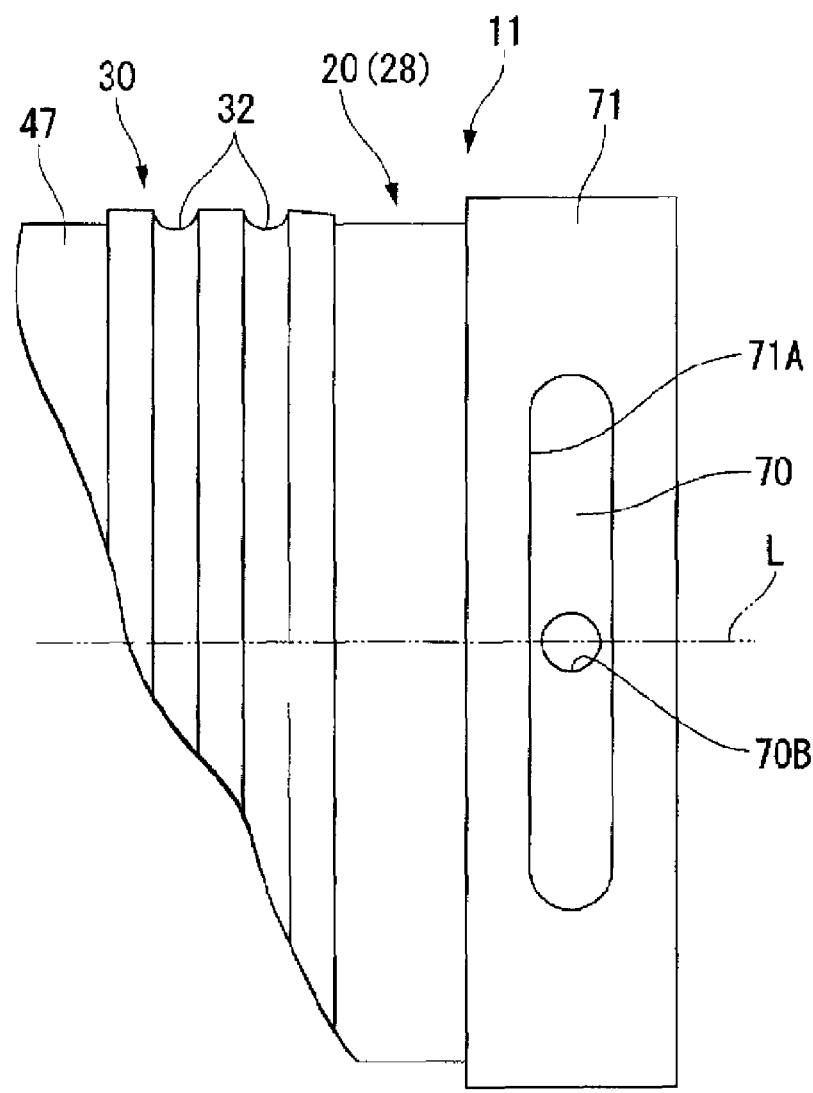
FIG. 7 is a plan view of another end side of a rolling roll, wherein the hydraulic nut 60 and a male thread part 17 in FIG. 5 are omitted.
Figure 8:
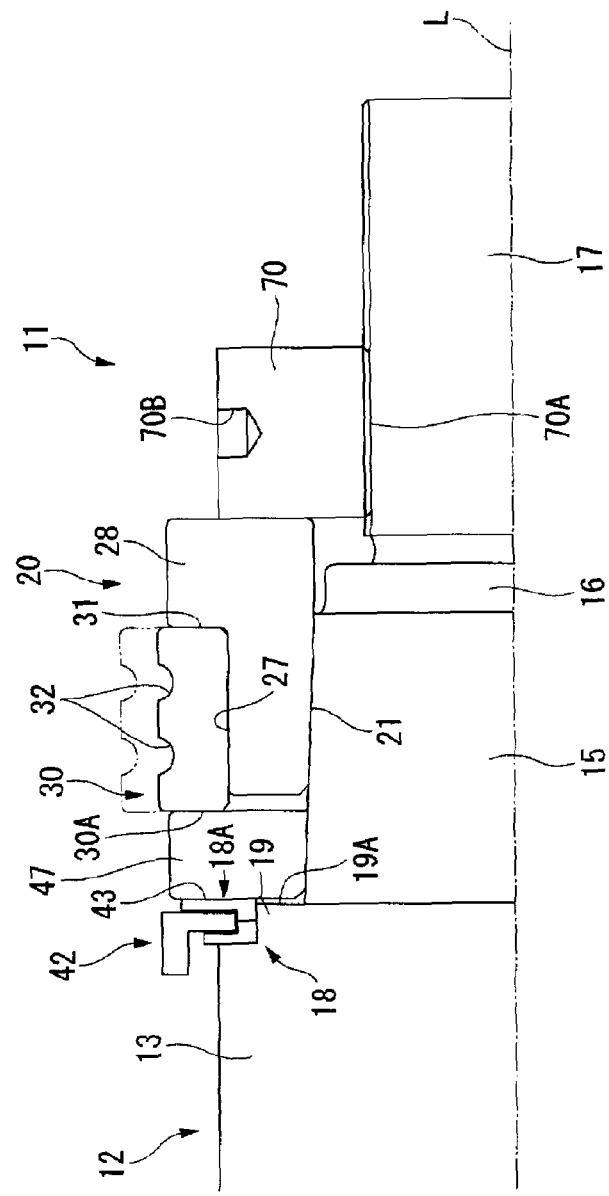
FIG. 8 is a side cross sectional view of a rolling roll according to a further embodiment of the present invention.
Figure 9:
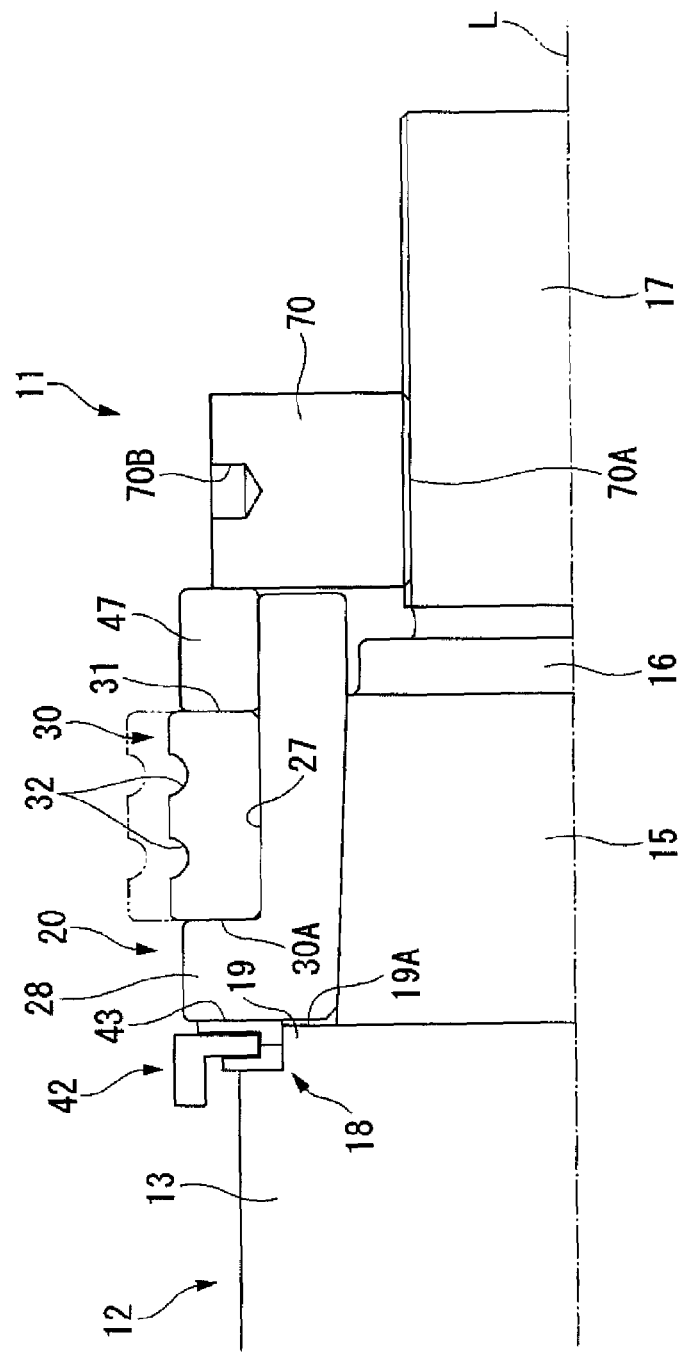
FIG. 9 is a side cross sectional view of a rolling roll according to an embodiment of the present invention.
Figure 10:
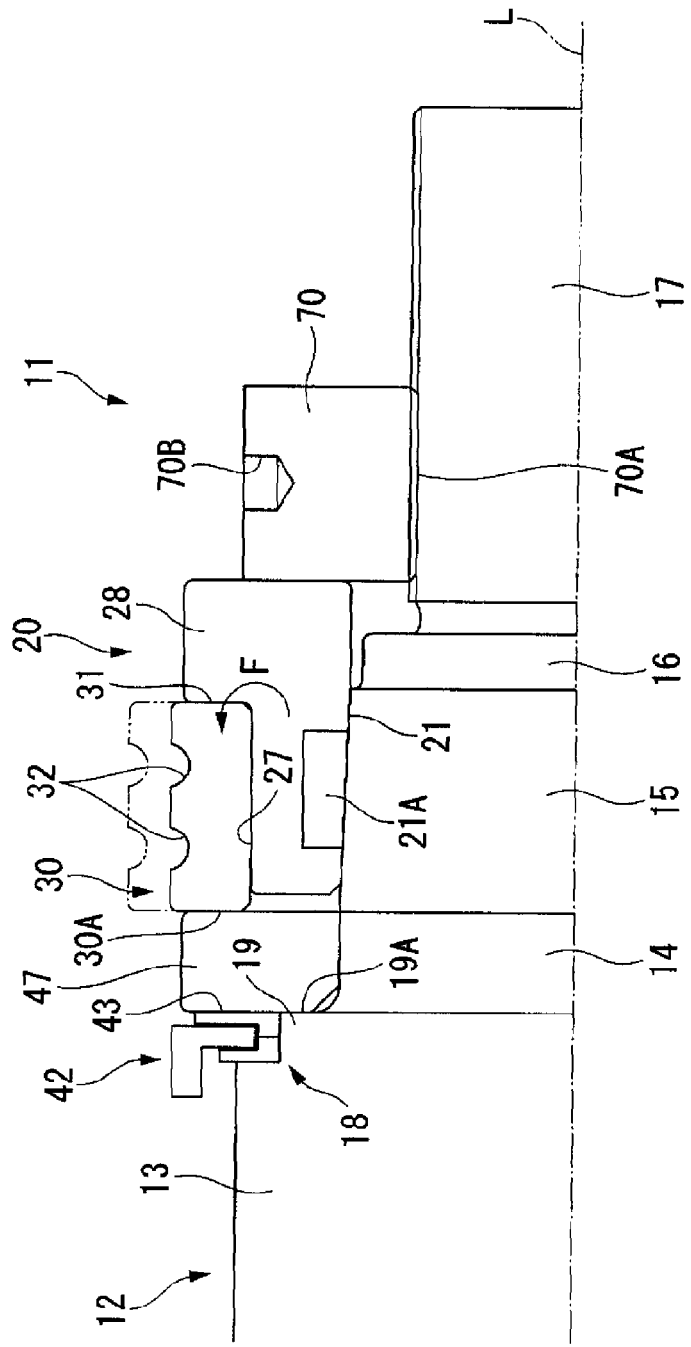
FIG. 10 is a side cross sectional view of a rolling roll according to an embodiment of the present invention.
Figure 11:
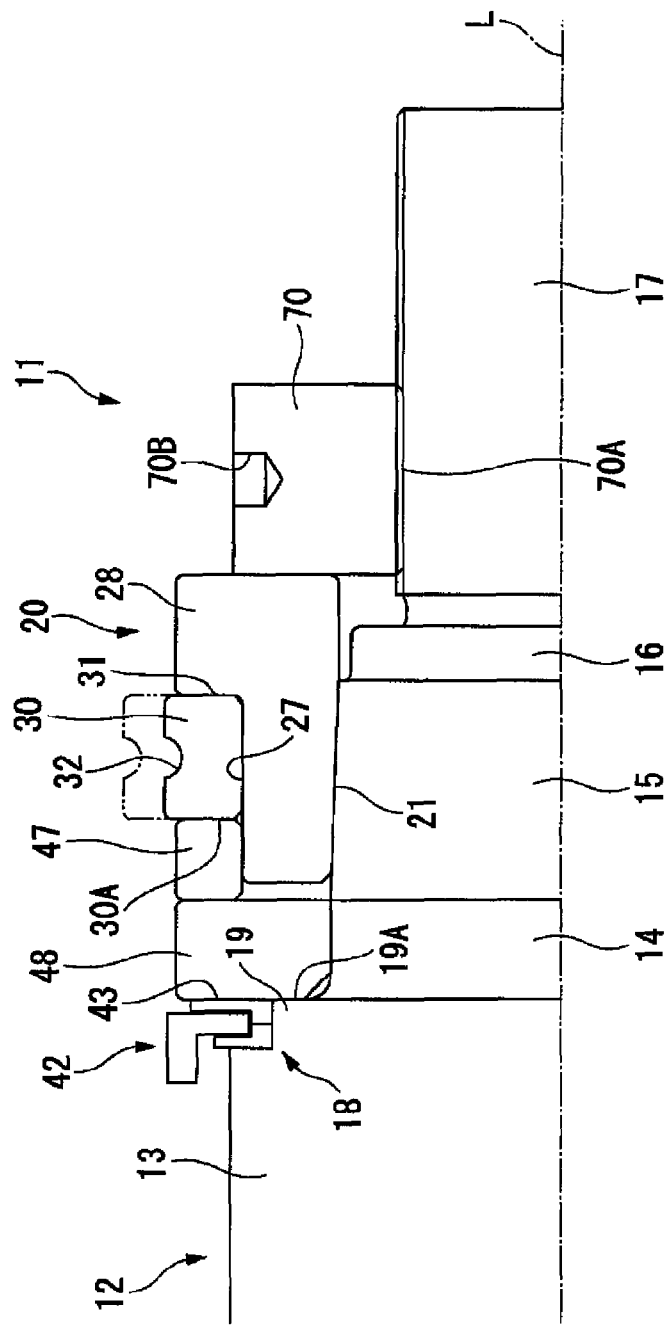
FIG. 11 is a side cross sectional view of a rolling roll according to another embodiment of the present invention.
Figure 12:
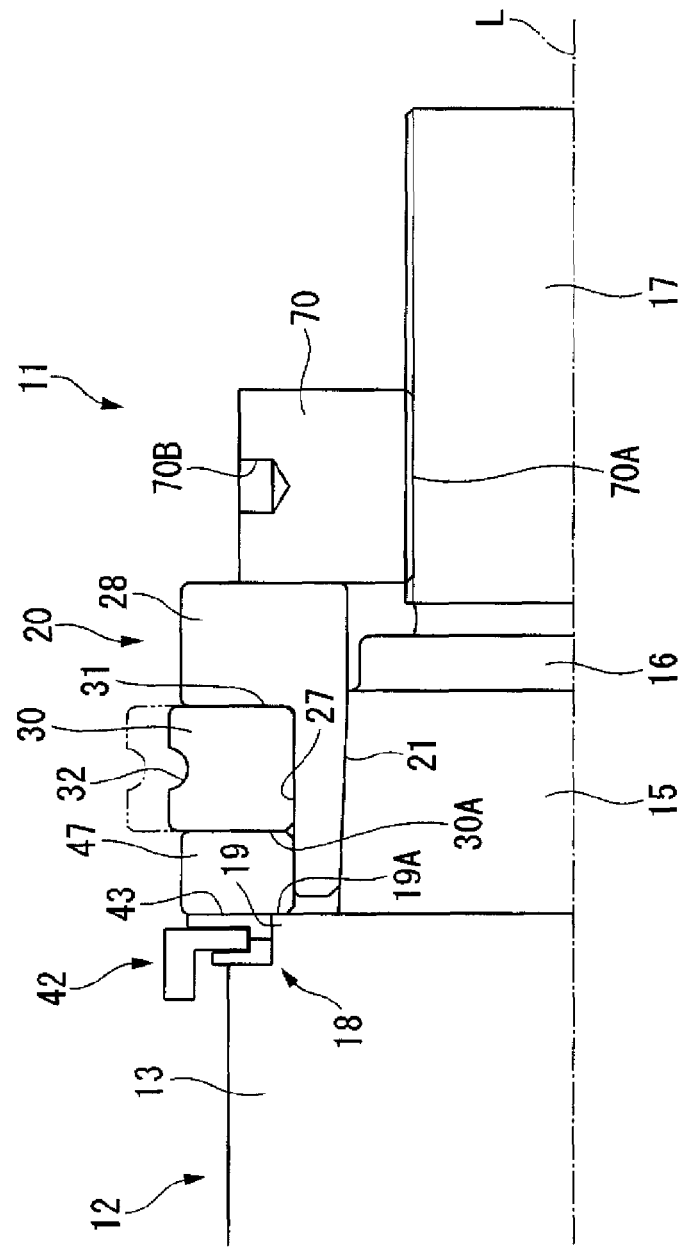
FIG. 12 is a side cross sectional view of a rolling roll according to a further embodiment of the present invention.

In addition, another aspect common to certain embodiments is that a side surface support part 28, which is contacted by the pressed surface 31 (the side surface of the rolling ring 30 that faces the other end side) or a side surface 30A (the side surface of the rolling ring 30 that faces the one end side), is formed integrally with the sleeve member 20 at its outer circumference. One embodiment is shown in FIG. 5 through FIG. 7, another embodiment is shown in FIG. 8, and other embodiments are shown in FIG. 10 through FIG. 12, respectively. In these embodiments the side surface support part 28, which contacts the pressed surface 31, is formed as a protruding part, which has a square cross section, on the other end side of the inner circumferential support part 27 so that it has the shape of a ring that is perpendicular to the inner circumferential support part 27; furthermore, in the embodiment shown in FIG. 9, the side surface support part 28, which contacts the side surface 30A of the rolling ring 30, is similarly formed as an annular protruding part on the one end side of the inner circumferential support part 27.

Furthermore, in certain embodiments, the flange part 24 and the constant diameter part 25, the outer diameter of which is smaller than the projecting part (the inner circumferential support part), are not provided to the sleeve member 20 as in the first embodiment, and the sleeve member 20 has an L shaped cross section. In addition, the outer diameter of the side surface support part 28 is substantially the same as the discard outer diameter of the rolling ring 30; however, as shown in the drawing, it is slightly smaller. Furthermore, in some embodiments, multiple (2) forming grooves 32 are formed in the rolling ring 30 lined up in the directions of the axis L; in contrast, other embodiments, only one forming groove 32 is formed, the same as in the initial embodiments.

In addition, another aspect common to certain embodiments is that, on the side where the side surface support part 28 is not integrally formed with the sleeve member 20, a ring shaped spacer 47 is formed that serves as another side surface support part. In some embodiments, the width of the rolling ring 30 in the directions of the axis L is slightly smaller than the width of the inner circumferential support part 27 in the directions of the axis L from the one end side to the side surface support part 28 of the sleeve member 20, and the rolling ring 30 is configured so that, in the state wherein the pressed surface 31 is brought into contact with the side surface support part 28, one end thereof juts out from one end of the sleeve member 20, and the spacer 47 is disposed so that it is brought into contact with the side surface 30A of the rolling ring 30 that faces the one end side and juts out.

Moreover, in other embodiments, the width of the rolling ring 30 in the directions of the axis L is less than that of the inner circumferential support part 27, the inner diameter of the spacer 47 is equal to the inner diameter of the rolling ring 30, and, in the state wherein the rolling ring 30 contacts the side surface support part 28 of the sleeve member 20, the spacer 47 is brought into contact with the rolling ring 30 by mating it with the remainder of the inner circumferential support part 27 so that it is slidable in the directions of the axis L, the same as the rolling ring 30. Furthermore, in other embodiments, the width of the spacer 47 in the directions of the axis L is slightly larger than the difference in the widths of the inner circumferential support part 27 and the rolling ring 30; accordingly, the end surface of the spacer 47 on the side opposite the rolling ring 30 juts out from the end surface of the sleeve member 20 on the side opposite the side on which the side surface support part 28 is formed.

In addition, in most of the embodiments, an annular groove 18, which has an L shaped cross section, is formed on an outer circumferential part of the end surface of the large diameter part 13 of the shaft 12 that faces the other end side, the receiving part 42, which comprises the receiving surface 43, is provided inside the annular groove 18, a step part 19, the diameter of which widens by one step toward the one end side, is formed by another end part of the large diameter part 13 on the inner circumferential side of the annular groove 18, and the surface of the step part 19 that faces the other end side is a torric surface that is perpendicular to the axis L. Furthermore, in certain embodiments, the surface of the step part 19 that faces the other end side is a receiving surface 19A of the shaft 12, which is flush with the receiving surface 43 of the receiving part 42, and the spacer 47, which is disposed on the one end side of the rolling ring 30, is brought into contact with the receiving surfaces 43, 19A (i.e., its inner circumferential side is brought into direct contact with the shaft 12) and is configured so that it receives the pressing force that is transmitted from the pressing member 50 via the sleeve member 20, the rolling ring 30, and the spacer 47.

Furthermore, in the embodiment shown in FIG. 11, the receiving surfaces 43, 19A are flush, the same as mentioned above; moreover, a spacer 48 is further interposed between the receiving surfaces 43, 19A and the spacer 47, which juts out from the surface of the sleeve member 20 on the one end side, and contacts the receiving surfaces 43, 19A, which thereby additionally receive the pressing force of the spacer 48. In contrast, in the other embodiments, the receiving surface 43 of the receiving part 42 is configured so that it slightly projects from the receiving surface 19A of the step part 19 of the shaft 12 toward the other end side; furthermore, the surfaces of the spacer 47 and the sleeve member 20 according to the different embodiments, that face the one end side are brought into contact with the receiving surface 43.

Furthermore, in certain embodiments, the same as in the previous embodiments, the medium diameter part 14, the outer diameter of which is constant and is one step smaller than the large diameter part 13, is formed in the shaft 12 from the large diameter part 13 toward the other end side, and the tapered part 15, the outer diameter of which gradually decreases toward the other end side, is formed further on the other end side of the medium diameter part 14; in contrast, in other embodiments, the medium diameter part 14 is not formed, and the tapered part 15 is formed immediately from the receiving surface 19A of the large diameter part 13. In addition, the spacer 47 and the spacer 48 in certain embodiments the inner diameters of which are constant inner diameters, are capable of mating with the medium diameter part 14 and are capable of sliding in the directions of the axis L; moreover, the spacer 47 has an inner diameter part that is a tapered hole, the inner diameter of which gradually decreases toward the other end side, but is configured so that a small clearance is ensured between itself and the tapered part 15 in the state wherein it is brought into contact with the receiving surface 43 as discussed above.

In addition, although the small diameter part 16 of the shaft 12 in the embodiments is shorter than in earlier embodiments, the male thread part 17 is longer, a pressing nut 70, which serves as a pressing member, is screwed to the male thread part 17, and the hydraulic nut 60 is disposed so that it can be attached to and detached from the male thread part 17 and can be removed during rolling. Namely, the method of assembling the rolling roll of the present invention according to certain embodiments will now be explained referencing an embodiment; first, the spacer 47, the rolling ring 30, and the sleeve member 20 are inserted onto the shaft 12 from the other end side and mated to the medium diameter part 14, the inner circumferential support part 27, and the tapered part 15, respectively, as shown in FIG. 5.

Next, the pressing nut 70 is screwed to the male thread part 17, and one end surface of the pressing nut 70 contacts the sleeve member 20 in certain embodiments and contacts the spacer 47, which juts out from the inner circumferential support part 27 toward the other end side, in an embodiment. In addition, a pressing ring 71 is disposed by loosely inserting it on the outer circumference of the pressing nut 70, and the hydraulic nut 60 is further screwed to the male thread part 17 from the other end side. Here, the pressing nut 70 is ring shaped with a square cross section and has an outer diameter that is larger than that of the inner circumferential support part 27 of the sleeve member 20 and smaller than that of the side surface support part 28, which is formed integrally with the sleeve member 20, and the spacer 47 that is in the seventh embodiment; furthermore, a female thread part 70A, which screws to the male thread part 17, is formed in the inner diameter part of the pressing nut 70, and one (or, if needed, more than one) engaging hole 70B, which is a blind hole with a circular cross section that extends perpendicular to the axis L toward the inner circumference, is formed in the outer circumferential surface of the pressing nut 70.

In addition, the pressing ring 71 is ring shaped with a square cross section and has an inner diameter that is larger than the outer diameter of the pressing nut 70 and smaller than the outer diameter of the side surface support part 28 and the outer diameter of the spacer 47 that is in an embodiment. However, the width of the pressing ring 71 in the directions of the axis L is slightly larger than that of the pressing nut 70, and the pressing ring 71 is configured so that the pressing ring 62 of the hydraulic nut 60 contacts the end surface of the pressing ring 71 that faces the other end side, as shown in FIG. 5. Furthermore, the pressing rings 62, 71 may be formed integrally. In addition, an elliptical window part 71A that extends in the circumferential directions is formed in the pressing ring 71 so that it passes therethrough radially, as shown in FIG. 7.

Furthermore, as shown in FIG. 5 and FIG. 7, the pressing ring 71 is disposed so that the engaging hole 70B of the pressing nut 70 can be viewed from the window part 71A, and the pressing ring 62 of the hydraulic nut 60 is brought into contact with the pressing ring 71; thereafter, when the hydraulic adjusting part 63 of the hydraulic nut 60 moves the pressing ring 62 toward the one end side, the rolling ring 30 is pressed toward the one end side via the pressing ring 71 that contacts the pressing ring 62, the side surface support part 28 of the sleeve member 20 in certain embodiments, as well as the spacer 47 in another embodiment.

Here, when the hydraulic nut 60 presses the rolling ring 30 toward the one end side in this manner, a gap is created between the pressing nut 70 and the sleeve member 20 in one set of embodiments, and between the pressing nut 70 and the spacer 47 in another embodiment; moreover, the portion of the shaft 12 that is on the other end side of the large diameter part 13 is generally stretched by the hydraulic nut 60 in accordance with the size of the gap and elastically deform such that it extends. Accordingly, from this state, a work tool, such as a round bar or a wrench, is passed through the window part 71A and engages with the engaging hole 70B of the pressing nut 70, and screws in the pressing nut 70 so that the gap disappears. Thus, the one end surface of the pressing nut 70 is once again brought into contact with and further presses, for example, the sleeve member 20 or the spacer 47.

Furthermore, when the hydraulic nut 60, the pressing ring 71, and the pressing nut 70 thus press the sleeve member 20 toward the one end side, the sleeve member 20, which mates with the tapered part 15 of the shaft 12 and the tapered hole 21, also elastically deforms slightly such that its diameter expands toward the outer circumferential side. However, the clearance between the inner circumferential support part 27 of the sleeve member 20 and the rolling ring 30 takes on a size that is commensurate with the degree to which the tensile stress does not act on the rolling ring 30 in the circumferential directions as a result of the expansion of its diameter caused by such elastic deformation.

Thus, the hydraulic nut 60 presses the rolling ring 30 toward the one end side. Furthermore, the pressing nut 70 is screwed in so that the gap between itself and the sleeve member 20 or the spacer 47 is eliminated, after which the pressing by the hydraulic adjusting part 63 of the hydraulic nut 60 is terminated and the hydraulic nut 60 is removed from the male thread part 17. Furthermore, when the pressing ring 71 is also removed from the shaft 12, the portion of the shaft 12 that is on the other end side of the large diameter part 13, which elastically deformed such that it extends because of the pressing force of the hydraulic nut 60, conversely contracts toward the one end side as a result of its elasticity and attempts to return to its original state; attendant therewith, the pressing nut 70 is pressed and fixed so that the rolling ring 30 is urged toward the one end side via the side surface support part 28 of the sleeve member 20, the spacer 47, or the like. Namely, in certain embodiments, after the hydraulic nut 60 is thus removed, the shaft 12 itself functions as the pressing mechanism and urges the rolling ring 30 toward the one end side.

Accordingly, embodiments are configured in this manner, the same as in the initial embodiments, tensile stress does not act on the rolling ring 30 in the circumferential directions; therefore, it is possible to prevent cracks from occurring in the rolling ring 30 and thus increase its life—while reducing its wall thickness—and significantly decrease cost; moreover, it is possible to make the axial center of the rolling ring 30 coincide with the axis L of the shaft 12 reliably using the inner circumferential support part 27 of the sleeve member 20, which makes it possible to perform high precision rolling. In addition, it is likewise possible to improve the sealability of the shaft 12 and simplify the seal structure.

Furthermore, in certain embodiments, the inner circumferential support part 27 is integrally formed with the sleeve member 20, after which the side surface support part 28 is also integrally formed with the sleeve member 20, and therefore it is possible to reduce the number of parts even more than with the initial embodiments, and thereby to greatly simplify management and reduce costs. In addition, in these embodiments, even if the hydraulic nut 60 is detachable from the shaft 12 and is removed therefrom during rolling, the shaft 12 itself functions as the pressing mechanism as discussed above and can maintain the state wherein the rolling ring 30 is pressed and fixed by urging it toward the one end side; therefore, the mass of the portion on the other end side of the shaft 12 can be reduced during rolling, and therefore it is possible to perform rolling with much higher precision by preventing, for example, runout, particularly with respect to the cantilevered shaft 12.

Moreover, in the embodiments, the spacers 47, 48 directly contact the receiving surface 19A of the step part 19, which is formed in the large diameter part 13 of the shaft 12, and receive the impact of the pressing force that presses the rolling ring 30; therefore, it is possible to increase the mounting rigidity of the rolling ring 30 and to greatly improve rolling accuracy. In addition, even in certain embodiments, wherein the spacer 47, the side surface support part 28 of the sleeve member 20, and the like do not directly contact the receiving surface 19A, the pressing force from the receiving part 42 impacts a wall surface 18A of the annular groove 18, which is formed in the large diameter part 13, that faces the other end side, and therefore it is possible to similarly fix the rolling ring 30 with high mounting rigidity.

Furthermore, in an embodiment, the recessed part 21A is formed in the tapered hole 21 on the inner circumferential side of the sleeve member 20; in addition, when the rolling ring 30 is pressed toward the one end side via the side surface support part 28 by a pressing force toward the one end side that is imparted to the sleeve member 20, wherein the recessed part 21A is formed, the recessed part 21A of the sleeve member 20 is pressed wider, which elastically deforms the side surface support part 28 just slightly so that it collapses toward the rolling ring 30 side and, attendant with that deformation, it is possible to impart a large compressive stress to the rolling ring 30 in addition to the pressing force, as shown by an arrow F in FIG. 10. According to the eighth embodiment configured in this manner, it is possible to more reliably prevent cracks from occurring in the rolling ring 30, and thereby to further extend its life and greatly lower costs.

Figure 13:
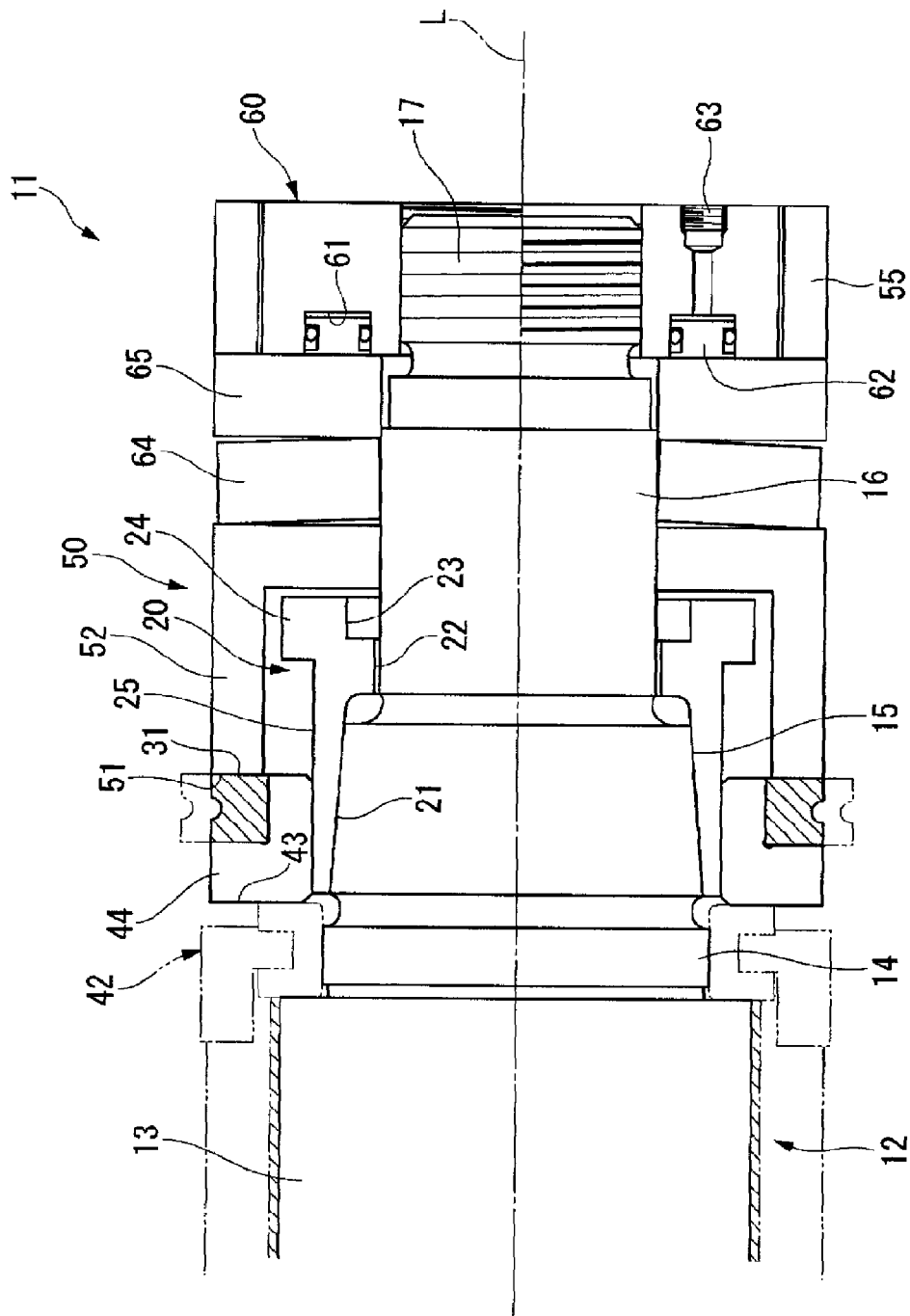
FIG. 13 is a side cross sectional view of a rolling roll according to an embodiment of the present invention.
Figure 14:
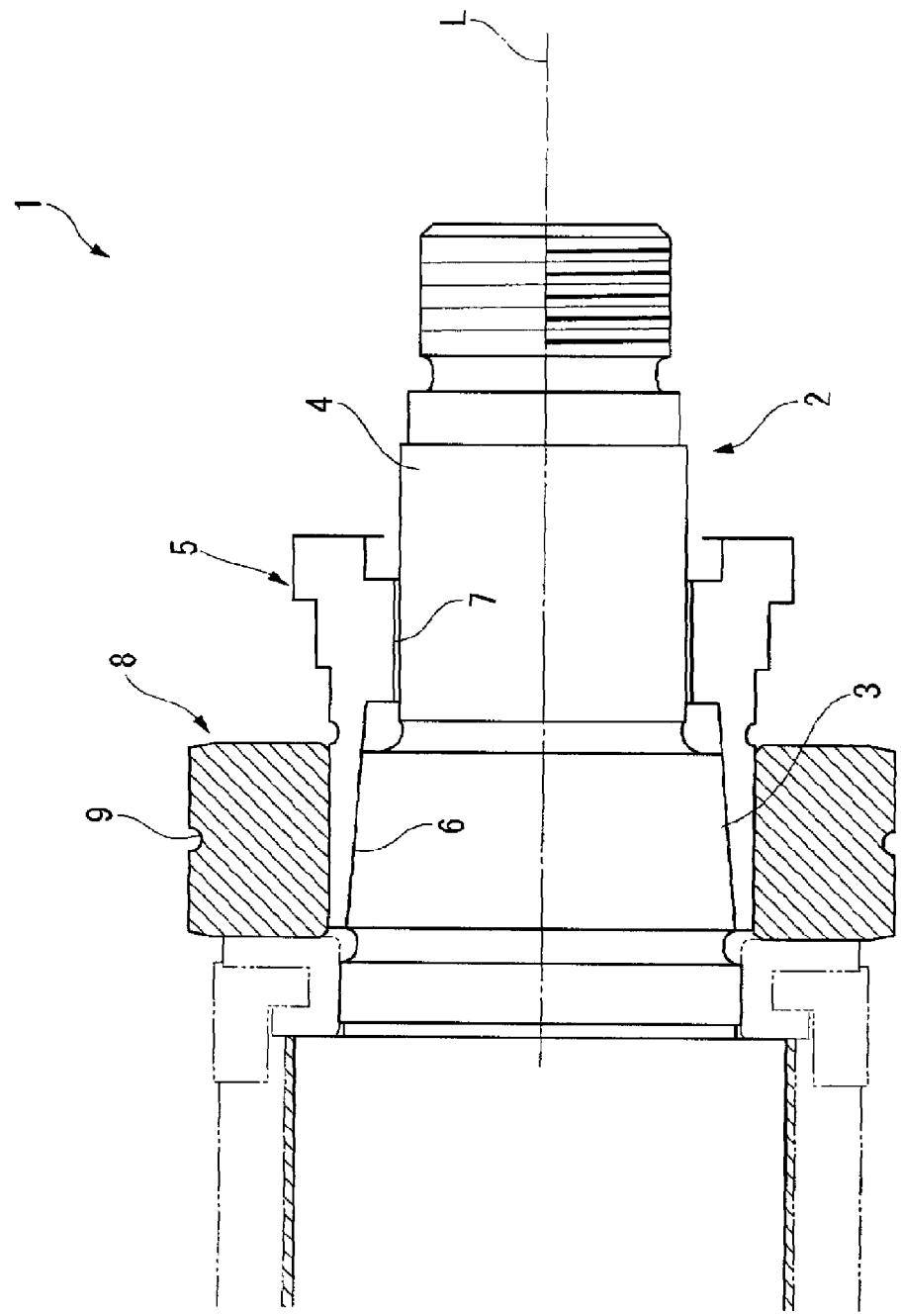
FIG. 14 is a side cross sectional view of a conventional rolling roll.

Lastly, FIG. 13 shows an embodiment of the present invention wherein the basic configuration is the same as that of the second embodiment shown in FIG. 2, but a disc spring 64, which serves as an elastic member, is interposed between the pressing member 50 and the hydraulic nut 60. Furthermore, in the embodiment shown in FIG. 13, portions that are common to the initial embodiments are assigned identical symbols; furthermore, the pressing member 50 in the eleventh embodiment is configured such that: its portion on the other end side is formed in a torric plate shape, the center of which is the axis L, that is perpendicular to a cylinder, the center of which is the axis L, that forms its one end side portion; the portion on the other end side is fitted onto the small diameter part 16 of the shaft 12; and the retainer mounting part 53, the coupling part 54, which is inclined so that its outer diameter and its inner diameter gradually decrease toward the other end side, and the like are not provided as they are in the initial embodiment.

In addition, the retainer 55 has a cylindrical shape, the diameter of which is larger than that of the hydraulic nut 60, and is screwed to the outer circumference of the hydraulic nut 60; furthermore, a toric plate shaped washer 65 is fitted onto the small diameter part 16 of the shaft 12 on the one end side of the hydraulic nut 60 and the retainer 55. Furthermore, in the embodiment, the outer diameters of the retainer 55, the washer 65, and the pressing member 50 are equal to the outer diameter of the L-shaped spacer 44. Furthermore, the disc spring 64 is brought into contact with the end surface of the washer 65 that faces the one end side and the end surface of the pressing member 50 on the other end side, and is interposed between the pressing member 50 and the hydraulic nut 60 via the retainer 55 and the washer 65.

With the rolling roll 11 of the embodiment, if the hydraulic adjusting part 63 of the hydraulic nut 60 moves the pressing ring 62 toward the one end side, then the disc spring 64 is compressed via the washer 65, the pressing member 50 is pushed toward the one end side, and the rolling ring 30 is thereby pressed; therefore, in this state, the retainer 55 is screwed toward the one end side and brought into contact with the other end surface of the washer 65, which fixes the position of the washer 65 in the directions of the axis L and thus fixes the rolling ring 30. Accordingly, in this state, it is possible to maintain the state wherein the rolling ring 30 is fixed even if the hydraulic adjusting part 63 of the hydraulic nut 60 terminates the pressure.

Furthermore, in this embodiment, the disc spring 64, which serves as an elastic member, is interposed between the hydraulic nut 60 and the pressing member 50 and, in the state wherein the rolling ring 30 is fixed as discussed above, functions as a pressing mechanism that is capable of urging the rolling ring 30 toward the one end side; therefore, it is possible to fix the rolling ring 30 reliably and rigidly, and thereby to perform the rolling process stably—even if the pressing by the hydraulic nut 60 is terminated. Moreover, for example, by replacing the disc spring 64, which serves as an elastic member, with one of a different coefficient of elasticity or by varying the number of interposed disc springs 64, it is possible to adjust the force with which the elastic member urges the rolling ring 30, which makes it possible to fix the rolling ring 30 by urging it with an urging force that is appropriate to the load and the like that act on the rolling ring 30 during the rolling process.

The above explained embodiments of the present invention based on the drawings, but the specific constitution is not limited to these embodiments, and it is understood that variations and modifications may be effected without departing from the spirit and scope of the invention.

For example, it was explained that the rolling ring is formed from cemented carbide, but the present invention is not limited thereto, and the rolling ring may be formed from some other hard material. For example, forming the rolling ring from a material that has high hardness, such as an ultrafine grain alloy, makes it possible to improve its abrasion resistance, which is preferable.

In addition, it was explained that a hydraulic nut is provided that serves as a pressing mechanism that urges the pressing member toward the one end side, but the present invention is not limited thereto, and some other pressing mechanism may be used, e.g., one that presses by the screwing in of a nut. However, providing a hydraulic nut as in the present embodiments makes it possible to urge the pressing member easily and to significantly reduce the time and labor needed to perform the rolling roll assembly work, and therefore the use of the hydraulic nut is preferable.

Furthermore, it was explained that a side surface support part is disposed that supports a side surface of the rolling ring, but the side surface support part does not have to be provided. However, disposing the side surface support part as in the present embodiments makes it possible to shorten the rolling ring in the directions of the axis L, which is preferable.

In addition, it was explained that a forming groove, which has a semicircular cross section and is recessed radially toward the inner side, is formed in the outer circumferential surface of the rolling ring, but the shape of the outer circumferential surface of the rolling ring is not limited thereto, and it is preferable to design the rolling ring appropriately taking into account, for example, the shape and the material of the product that is to be formed by rolling.

What is claimed is:

1. A rolling roll comprising:
   a shaft rotatable around an axis and having a first end side that is connected to an output shaft of a rolling mill;
   a tubular sleeve member mounted to a portion of the shaft on a second end side of the shaft, said sleeve member being separate from the shaft;
   a rolling ring formed from a hard material, and fixed to an outer circumference of the sleeve member; and
   an inner circumferential support part disposed on an outer circumference of the sleeve member, wherein
   the rolling ring is supported by the sleeve member via the inner circumferential support part,
   a pressing member directly presses the side surface of the rolling ring that faces the second end side, said pressing member being separate from the shaft and being disposed on the second end side of the rolling ring,
   a pressing mechanism urges the pressing member toward the first end side, and is disposed on the second end side of the rolling ring, and
   the pressing member and the pressing mechanism press the rolling ring toward the first end side such that the rolling ring is fixed in a state where a compressive stress acts on the rolling ring in an axial direction.

2. A rolling roll according to claim 1, wherein
   the inner circumferential support part is a spacer that is interposed between the sleeve member and the rolling ring, said spacer contacting a side of the rolling ring that faces the first end side of the shaft.

3. A rolling roll according to claim 1, wherein
   the inner circumferential support part is press-fitted to an inner circumferential surface of the rolling ring to be fixed.

4. A rolling roll according to claim 1, wherein
   the inner circumferential support part is bonded to the rolling ring.

5. A rolling roll according to claim 1, wherein a clearance is formed between the rolling ring and the inner circumferential support part, said clearance allowing for the sliding of the rolling ring in the axial direction.

6. A rolling roll according to claim 1, wherein the rolling ring is made of cemented carbide.

7. A rolling roll according to claim 1, wherein the rolling ring is directly fixed to an outer circumference of the sleeve member.

8. A rolling roll according to claim 1, further comprising a side surface support part contacting a side surface of the rolling ring and disposed on the outer circumferential side of the sleeve member.

9. A rolling roll according to claim 8, wherein
   the side surface support part is formed integrally with the inner circumferential support part; and
   further comprising a recessed part formed on the inner circumferential side of the inner circumferential support part.

10. A rolling roll according to claim 1, wherein
    the inner circumferential support part is formed integrally with the sleeve member.

11. A rolling roll according to claim 10, wherein
    the inner circumferential support part is a projecting part that projects from the outer circumference of the sleeve member radially toward the outer side.

12. A rolling roll according to claim 1, wherein the pressing mechanism comprises a hydraulic nut disposed on the second end side of the pressing member.

13. A rolling roll according to claim 12, further comprising an elastic member interposed between the pressing member and the hydraulic nut.

14. A rolling roll according to claim 12, wherein
    the pressing member is a pressing nut screwed to the shaft on the second end side of the rolling ring; and
    the hydraulic nut is disposed detachably.

* * * * *